US011809545B2

(12) United States Patent
Scarlata et al.

(10) Patent No.: US 11,809,545 B2
(45) Date of Patent: Nov. 7, 2023

(54) FLEXIBLE CONTAINER ATTESTATION

(71) Applicant: Intel Corporation, Santa Clara, CA (US)

(72) Inventors: Vincent R. Scarlata, Beaverton, OR (US); Carlos V. Rozas, Portland, OR (US); Baiju Patel, Portland, OR (US); Barry E. Huntley, Hillsboro, OR (US); Ravi L. Sahita, Portland, OR (US); Hormuzd M. Khosravi, Portland, OR (US)

(73) Assignee: Intel Corporation, Inc., Santa Clara, CA (US)

( * ) Notice: Subject to any disclaimer, the term of this patent is extended or adjusted under 35 U.S.C. 154(b) by 0 days.

(21) Appl. No.: 17/856,574

(22) Filed: Jul. 1, 2022

(65) Prior Publication Data
US 2022/0335117 A1 Oct. 20, 2022

Related U.S. Application Data

(63) Continuation of application No. 15/664,489, filed on Jul. 31, 2017.

(51) Int. Cl.
H04L 29/00 (2006.01)
G06F 21/44 (2013.01)
G06F 9/30 (2018.01)

(52) U.S. Cl.
CPC ............ G06F 21/44 (2013.01); G06F 9/3016 (2013.01)

(58) Field of Classification Search
CPC ................................ G06F 21/44; G06F 9/3016
USPC .......................................................... 726/19
See application file for complete search history.

(56) References Cited

U.S. PATENT DOCUMENTS

| 9,247,316 | B2 | 1/2016 | Evans et al. |
| 9,454,564 | B1 | 9/2016 | Miliauskas |
| 9,703,733 | B2 | 7/2017 | Rozas et al. |
| 2010/0082991 | A1* | 4/2010 | Baldwin ................. H04L 9/083 380/278 |
| 2012/0185694 | A1* | 7/2012 | Munetoh ................. G06F 21/57 713/168 |
| 2013/0159726 | A1 | 6/2013 | McKeen et al. |

FOREIGN PATENT DOCUMENTS

DE 102018005180 A1 1/2019

OTHER PUBLICATIONS

German Patent and Trademark Office; Office Action issued in German Patent Application No. 102018005180.4, dated Jun. 24, 2019; 13 pages including English translation.

* cited by examiner

Primary Examiner — Jeffrey C Pwu
Assistant Examiner — Michael D Anderson
(74) Attorney, Agent, or Firm — Nicholson De Vos Webster & Elliott LLP

(57) ABSTRACT

Data integrity logic is executable by a processor to generate a data integrity code using a hardware-based secret. A container manager, executable by the processor, creates a secured container including report generation logic that determines measurements of the secured container, generates a report according to a defined report format, and sends a quote request including the report. The defined report format includes a field to include the measurements and a field to include the data integrity code, and the report format is compatible for consumption by any one of a plurality of different quote creator types.

19 Claims, 30 Drawing Sheets

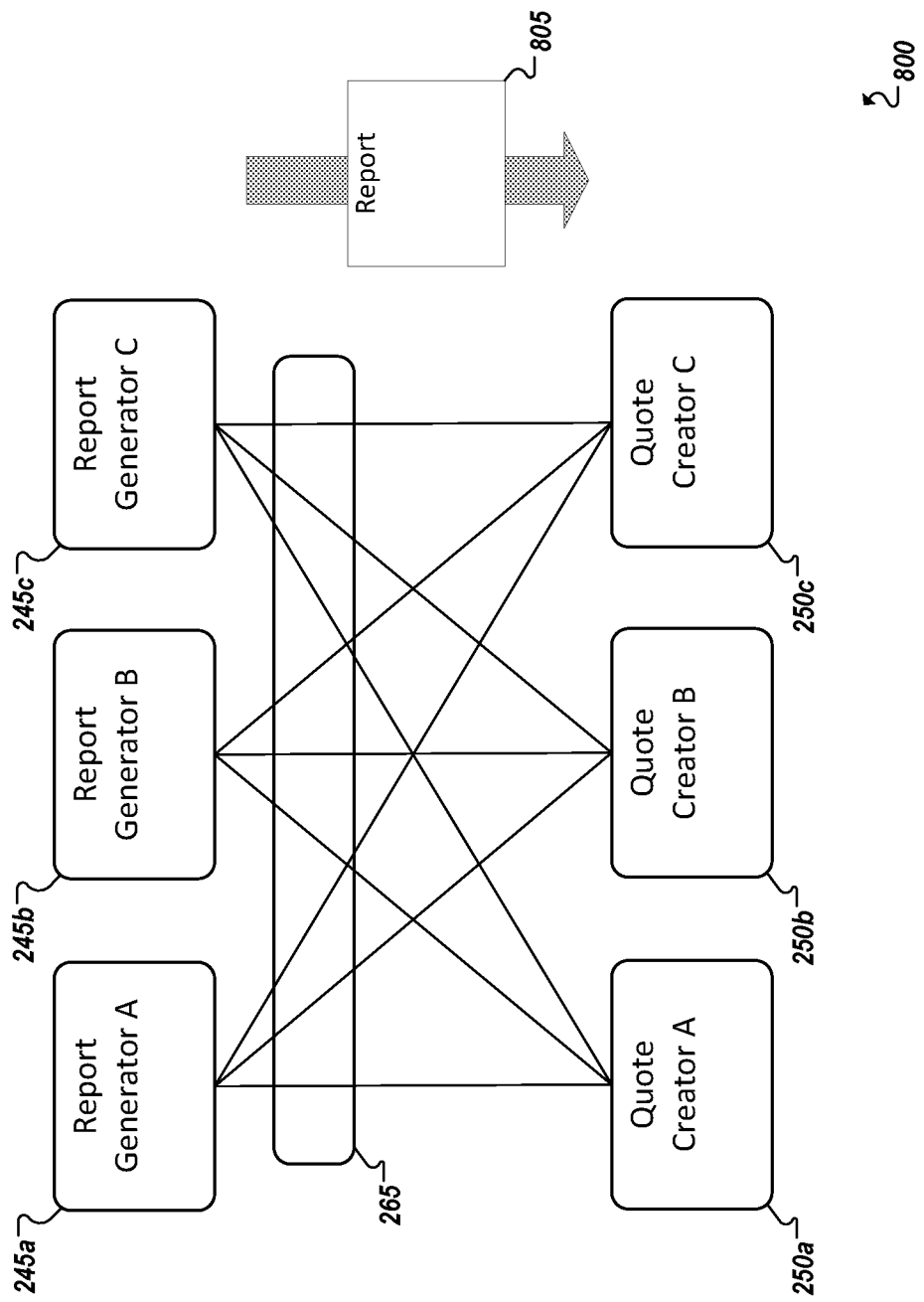

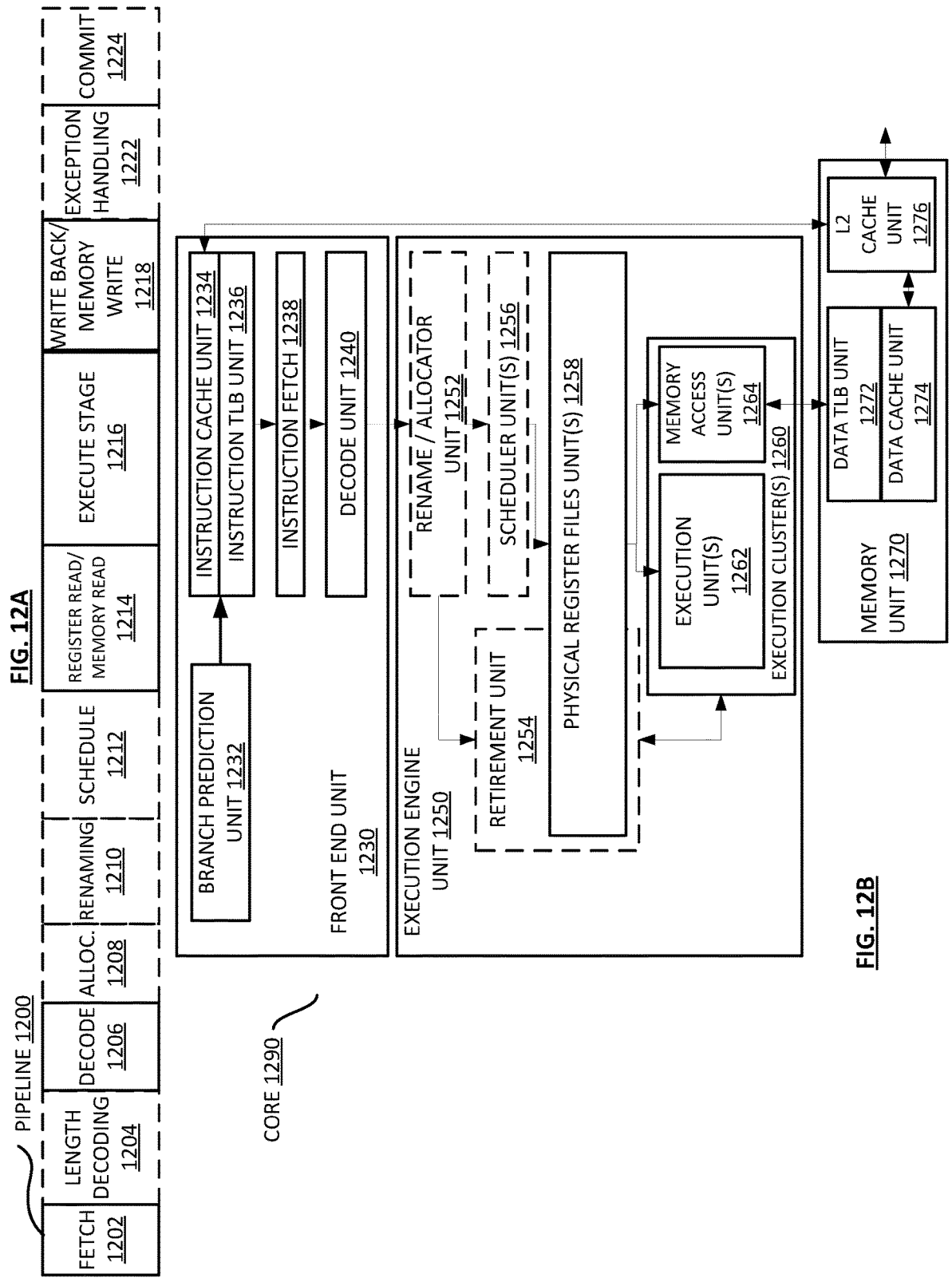

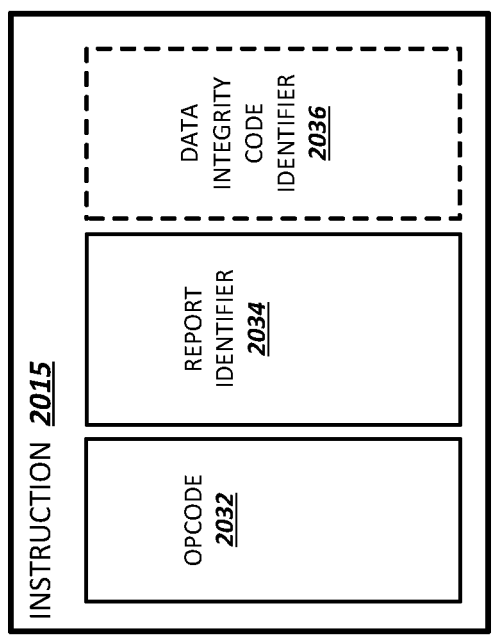

FLEXIBLE CONTAINER ATTESTATION

CROSS-REFERENCE TO RELATED APPLICATION

This application is a continuation of (and claims the benefit of priority under 35 U.S.C. § 120) U.S. application Ser. No. 15/664,489, filed Jul. 31, 2017, and entitled FLEXIBLE CONTAINER ATTESTATION. The disclosure of the prior application is considered part of and hereby incorporated by reference in its entirety in the disclosure of this application.

TECHNICAL FIELD

This disclosure relates in general to the field of computer security and, more particularly, to computing system attestation.

BACKGROUND

Software and services can be deployed over the Internet. Some services may be hosted on virtual machines to allow flexible deployment of a service. A virtual machine is an emulation of a computing system and can allow the service to migrate between or be launched simultaneously on multiple physical server systems. Software services may communicate data with other systems over wireline or wireless network. Some of this data may include sensitive content. While encryption and authentication may be utilized to secure communications between systems, trust may be required between the systems in order to facilitate such transactions. Malicious actors have employed techniques such as spoofing, man-in-the-middle attacks, and other actions in an attempt to circumvent safety measures put in place within systems to secure communications. Failure to establish a trusted relationship may make traditional communication security tasks ineffective.

BRIEF DESCRIPTION OF THE DRAWINGS

FIG. 8 is a simplified flow chart illustrating flexibility within example attestation system implementations;

FIG. 12A is a block diagram illustrating both an exemplary in-order pipeline and an exemplary register renaming, out-of-order issue/execution pipeline according to embodiments of the invention.

FIG. 12B is a block diagram illustrating both an exemplary embodiment of an in-order architecture core and an exemplary register renaming, out-of-order issue/execution architecture core to be included in a processor according to embodiments of the invention;

FIGS. 20A-C are simplified block diagrams of example instructions.

Like reference numbers and designations in the various drawings indicate like elements.

DETAILED DESCRIPTION OF EXAMPLE EMBODIMENTS

Figure 1:
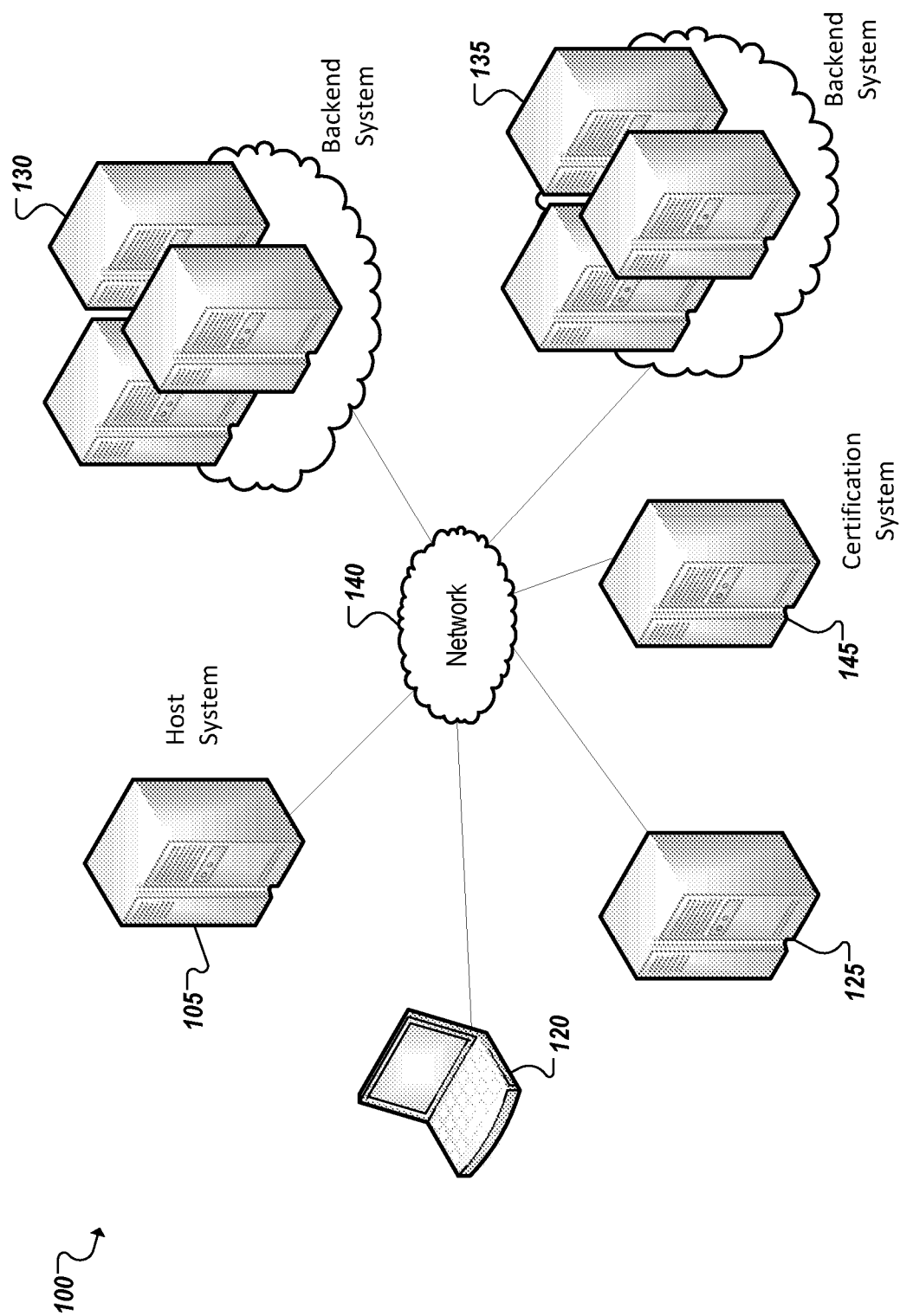
FIG. 1 is a simplified schematic diagram of an example system including a host system enabled to support container attestation system in accordance with one embodiment.

FIG. 1 is a simplified block diagram illustrating an example embodiment of a computing environment 100 including an example host system 105 capable of hosting one or more containers, in which one or more other software components may be hosted, such as virtual machines, software containers, microservice containers, and so on. The host system 105 may additionally be configured to host these containers using secure hardware, including secured memory and secured processor resources. A secured container may be a container hosted on a host system 105 using such secure hardware resources. A secured container may thus provide a trusted domain in which sensitive software components (e.g., processes, tools, microservices, applications, etc.) may be hosted and run and/or sensitive data accessed and processed. In some instances, it may be desirable to connect a particular software component hosted in a secured container with other software components, including component hosted on remote computing systems (e.g., 120, 130, 135, etc.) over one or more networks 140. In some examples, these remote computing systems (e.g., 120, 130, 135) may provide data for processing by the particular software component hosted in a secured container. In some implementations, allowing a particular software component to access particular data or intercommunicate with a particular system (e.g., 120, 130, 135) may be a preconditioned on the particular software component running in a secured container, or "trust domain." To demonstrate to the cooperating computing system (e.g., 120, 130, 135) that the particular software component is secured in a trust domain, the particular software component, or associated software component, or logic within the secured container, may attest that they run within a trusted secured container by sending attestation "quotes," generated by secured logical components on the host 105 of the secured container. Such quotes may attest to the authenticity and security (and other characteristics) of the secured container and the components (e.g., the particular software component) loaded and running (or prepared to run) within the secured container. The quote can be signed or include data that has been signed by a cryptographic key, cipher, or other element (collectively referred to herein as "keys") from which the receiving system (e.g., 120, 130, 135) can authenticate or confirm the trustworthiness of the quote (and thereby also the source of the quote). Such keys can be referred to as quoting keys. A quoting key may have an associated certificate or other information, which may be queried and used by the receiving system (e.g., 120, 130, 135), such as through interaction with a certification system 145 associated with a trusted certificate authority, among other examples.

As introduced above, in some cases, attestation can be carried out in connection with a client-server or frontend-backend interaction (e.g., over one or more networks 140) between an application hosted on a host system (e.g., 105) and a backend service hosted by a remote backend system (e.g., 130, 135). In other cases, the backend service may be run in a secured container hosted by an enabled host system (e.g., 105), with the client hosted on another remotely located system (e.g., 120), among other example implementations. Sensitive data and transactions can take place in such interactions and the application can attest to its trustworthiness and security to the backend system (and vice versa) using attestation logic resident on or other accessible to the host system (e.g., 105).

A certification system can maintain a database of certificates mapped to various host devices (e.g., 105) equipped with hardware and software to implement secured containers. In one example, each of the certificates can be derived from keys that are themselves based on persistently maintained, secure secrets provisioned on the host devices (e.g., 105) during manufacture. Accordingly, in some implementations, a certification system may be a system maintained and owned by the manufacturer of the host system or particular processors or other hardware components of the host system utilized to provide the secured containers. The secrets corresponding to these certificates remain secret to the host device and may be implemented as fuses, a code in secure persistent memory, among other implementations. The key may be the secret itself or a key derived from the secret. The certificate may not identify the key and the key may not be derivable from the certificate, however, signatures produced by the key may be identified as originating from a particular one of the host devices for which a certificate is maintained based on the corresponding certificate. In this manner, a host device (e.g., 105) can generate or be provided with a key mapped to a certificate hosted by the certification system 145. Such keys may be further used by quote creation logic on the host systems to sign quotes that attest to one or more applications or containers hosted on the host system 105.

As noted, software components hosted in secured containers of various host devices (e.g., 105) may interface and communicate with other systems, including backend systems (e.g., 120, 130, 135) over one or more network channels (of network 140). Cryptography may be employed to secure communications over these network channels. Networks 140, in some implementations, can include local and wide area networks, wireless and wireline networks, public and private networks, and any other communication network enabling communication between the systems, including combinations of such networks.

In general, "servers," "devices," "computing devices," "host devices," "user devices," "clients," "servers," "computers," "platform," "environment," "systems," etc. (e.g., 105, 120, 130, 135, etc.) can include electronic computing devices operable to receive, transmit, process, store, or manage data and information associated with the computing environment 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems.

Host devices (e.g., 105) can further include computing devices implemented as one or more local and/or remote client or end user devices, such as application servers, personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device (or environment 100). A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software of provided in environment 100. It will be understood that there may be any number of host devices associated with environment 100, as well as any number of host devices external to environment 100. Further, the term "host device," "client," "end user device," "endpoint device," "server," "device," "computing device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2A:
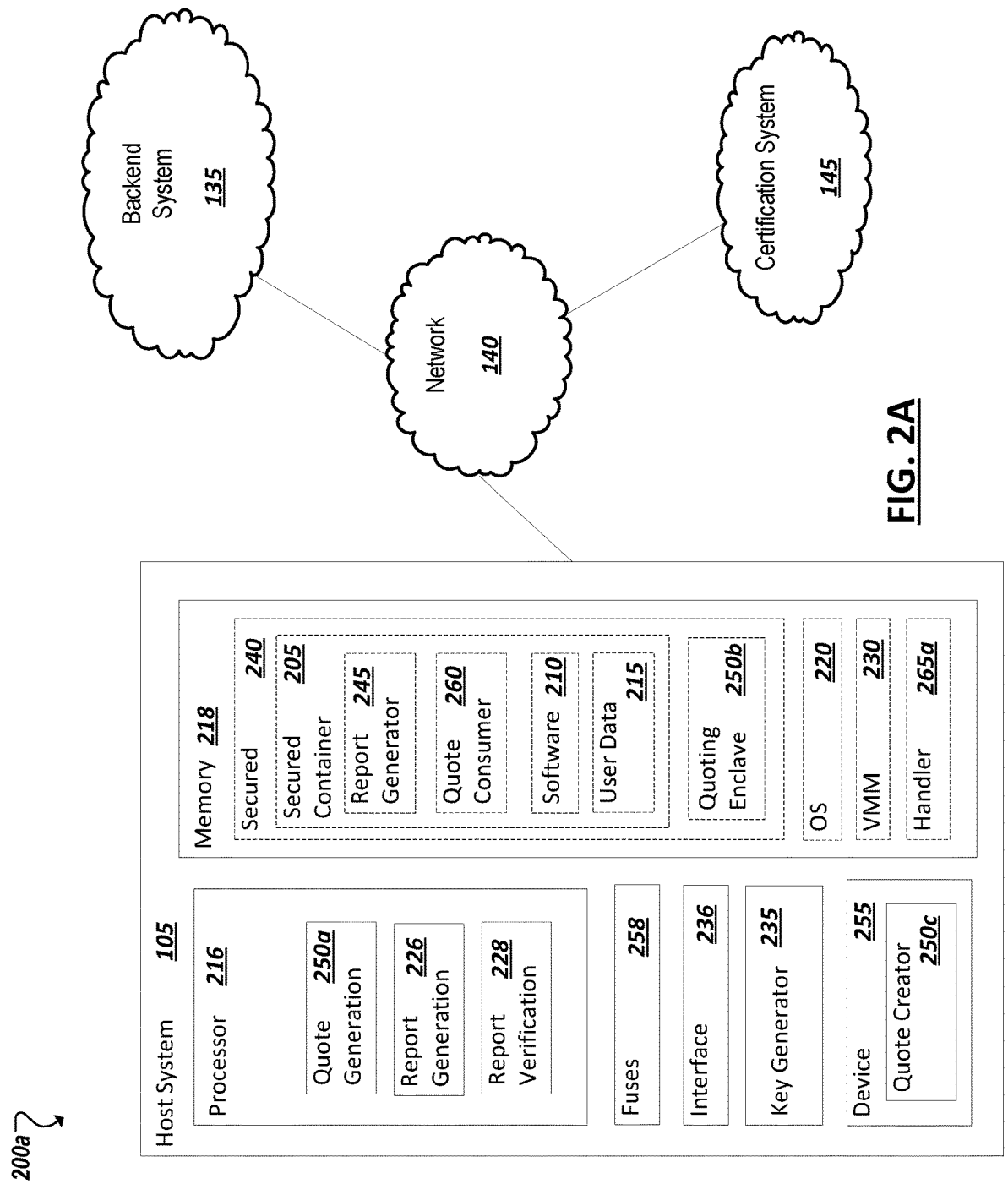
FIGS. 2A-2B are simplified block diagrams of an example system including an example platform supporting flexible attestation in accordance with some embodiments.
Figure 2B:
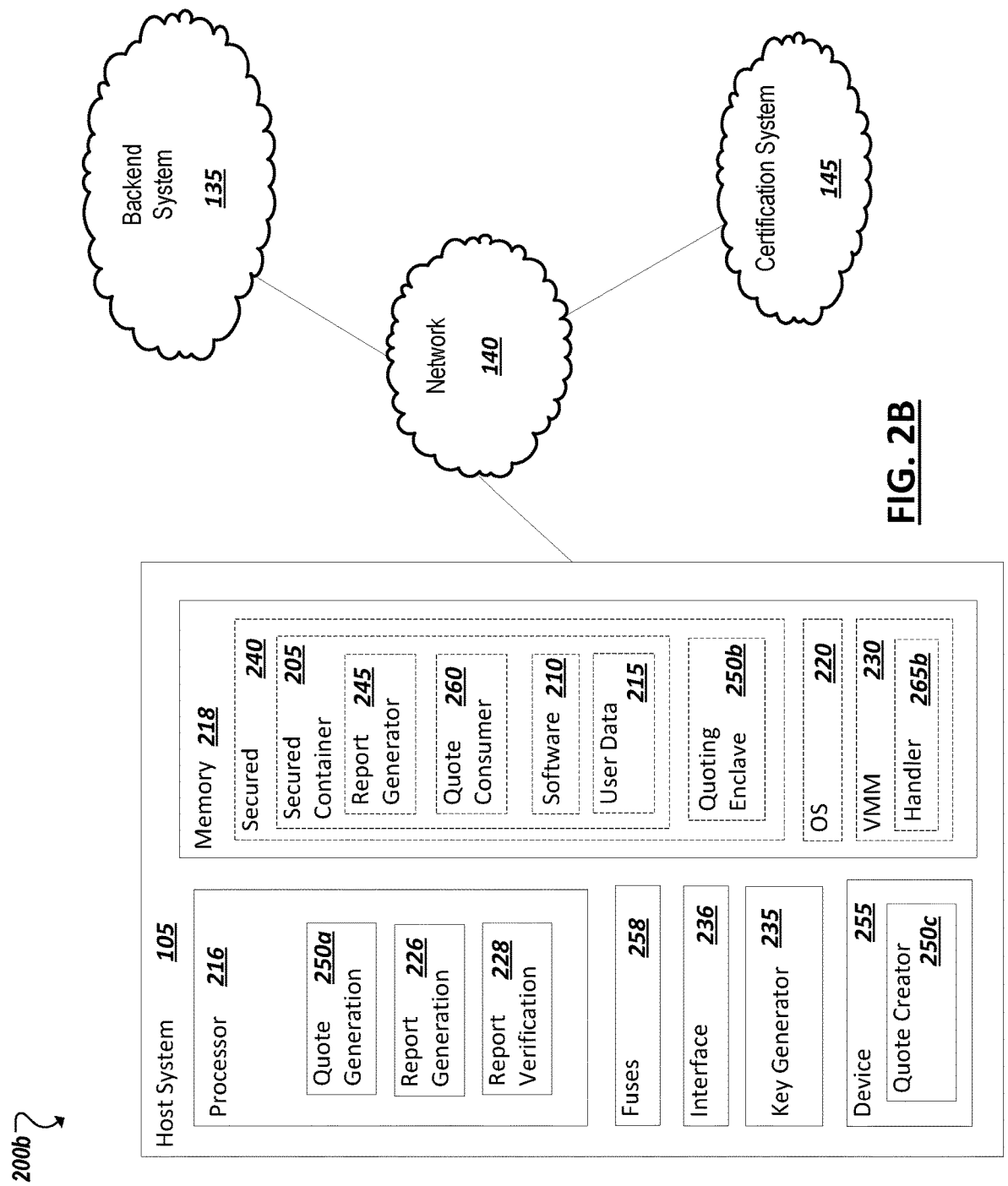

Turning to the examples of FIGS. 2A-2B, simplified block diagrams 200*a-b* are shown illustrating example implementation of computing systems includes an example host system 105 equipped to support one or more secured containers (e.g., 205) and logic to attest to the trustworthiness of the secured container and its contents (e.g., software 210, data 215, etc.). In these example illustrations, hardware components and logic are shown in solid lines, while transitory components (e.g., which may be loaded, run, instantiated, etc. at runtime) are shown in dashed lines. In these examples, a host system 105 can include one or more processor devices 216, one or more memory elements 218, and other components implemented in hardware and/or software, including an operating system (OS) 220, container manager (such as a virtual machine manager (VMM) 230), key generation logic 235, communication interface logic 236, among other examples. Secured containers 205 can be implemented on the host device 105 using secure memory 240 (e.g., as opposed to general system memory) and utilizing secured processing functionality of at least one of the processors (e.g., 216) of the host system to implement private regions of code and data to provide certain secured or protected functionality of the application. Logic, implemented in an instruction set, firmware and/or software of the host system (such as hardware logic (e.g., 250a, 226, 228) supporting the ISA of the CPU (e.g., 216) of the host), can be provided on the host system 105 that can be utilized (e.g., by a container manager 230 launching one or more secured containers 205 on the host system 105) to set aside such private regions of code and data, which are subject to guarantees of heightened security and restricted access. For instance, a secured container 205 may be implemented and assigned protected memory regions to protect sensitive data from unauthorized access or modification by rogue software running at higher privilege levels and preserve the confidentiality and integrity of sensitive code and data without disrupting the ability of legitimate system software to schedule and manage the use of platform resources. Software components 210 and data (e.g., user data, cryptographic codes, or other sensitive data) may be hosted within the secured container using the assigned secured regions of code and data, allowing confidentiality and integrity to be maintained even when an attacker has physical control of the platform and can conduct direct attacks on memory, among other examples.

Figure 3:
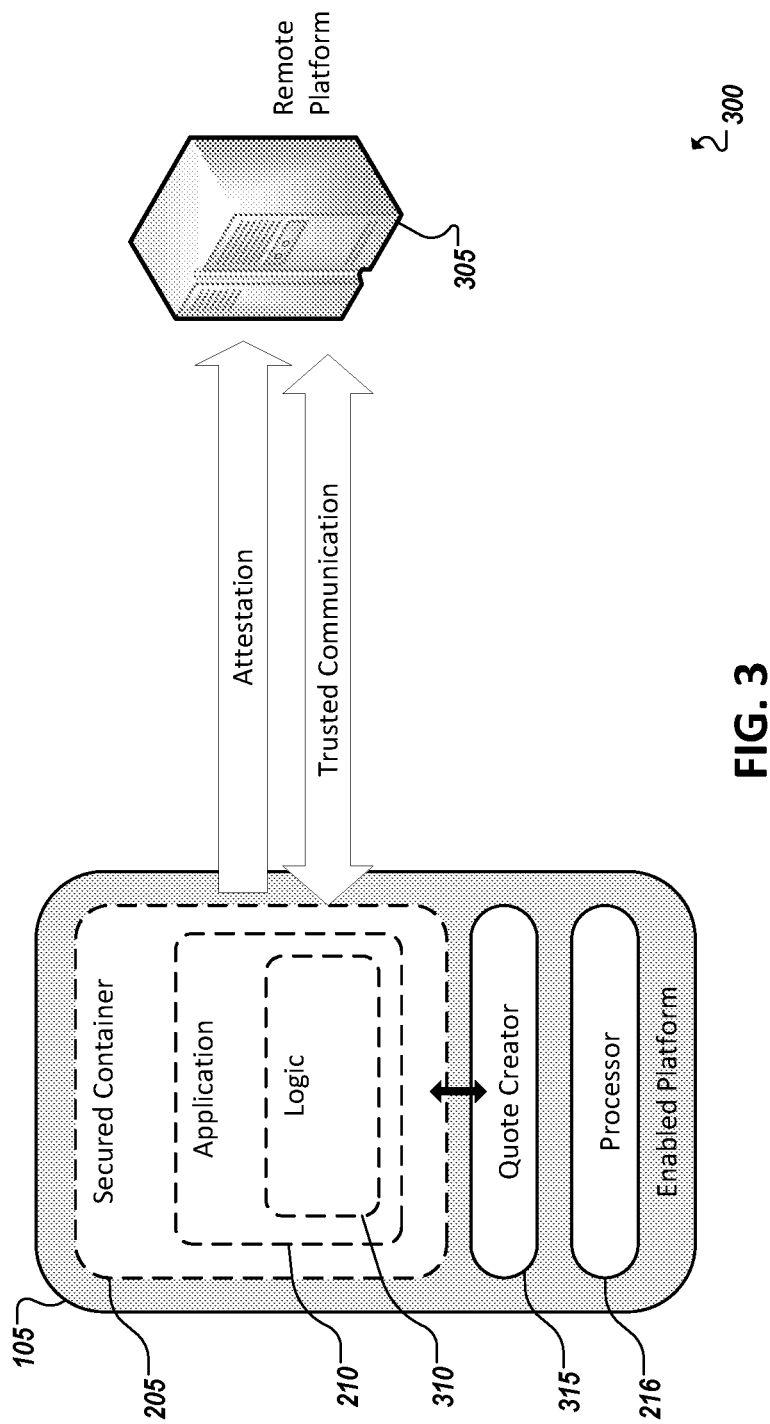
FIG. 3 is a simplified block diagram representing attestation in accordance with one embodiment.

Turning briefly to FIG. 3, a simplified block diagram 300 is presented illustrating protection afforded through a secured container 205. For instance, in this example, a trust domain embodied by the secured container 205 may host an application 210 or other software component, thereby protecting all or a portion of the application and allowing the application (and its security) to be attested to. In some implementations, the host system 105 may be enabled to provide and attest to such secured containers 205 (e.g., through the inclusion of a particular processor device (e.g., 216) including instructions to support the generation, measurement, and attestation of secured containers). Such a host system 105, for instance, may provide or be used to implement a hosting service, such as a cloud hosting service in which various software components and services may be hosted in secured containers 205 built up (and torn down) to facilitate the (in some cases, dynamic) hosting of instances of the software component (e.g., on demand). These software components may make use of or interoperate with other systems, such as a remote platform 305, which may prefer or require that clients or other system, with which it interfaces, possess certain security features or guarantees, such that the platform 305 can verify that it is transacting with who the cooperating system (e.g., 210) says it is. For instance, malware can sometimes be constructed to spoof the identity of a user or an application in an attempt to extract sensitive data from, infect, or otherwise behave maliciously in a transaction with the platform or service 305. Signed attestation (or simply "attestation") can allow an application (e.g., 210) to verify that it is a legitimate instance of the application (i.e., and not malware). Other applications that are not run within a secured container (e.g., including other applications hosted on the same host system but not in a secured container (e.g., in a virtual machine run using general hardware resources of the host system)) may be vulnerable to such threats and may be insufficiently trusted by the remote platform. Other software components, hosted on other systems, may be, in fact, secured in accordance with requirements of a platform's service(s) 305, but may not be able to effectively attest to the service provider 305, leaving the service provider in doubt, to some degree, of the application's authenticity and trustworthiness. Attestation can guard against such insecure, malicious, and faulty transactions, and attestation logic 310 may be provided in the secured container 205 and, in some cases, be included in or associated with the code of the software component 210 hosted in the secured container 205. This logic 310 can interface with quote creator logic 315 implemented using secured computing resources within the attestation-enabled host system 105 to obtain an attestation quote, which may be used to attest to the security of the application 210 and its container 205, among other examples. For instance, the quote may be obtained from the quote creator logic 315 and used by the application to send an attestation message (that includes the quote) in order to attest to the trustworthiness of the application 210 to the remote platform 305. The remote platform may validate the quote by querying an associated certificate authority to determine whether the quote was generated by a host platform (e.g., 105) known to possess the hardware capable of providing the secured container. In this example, upon validating the quote, the remote platform 305 may establish a trusted communication channel with the application 210 running in the trust domain 205 and provide data and/or services based on the trust established through the attestation.

Returning to FIGS. 2A-2B, attestation can be provided on the basis of a signed piece of data, or "quote," that is signed using an attestation key securely provisioned on the platform. Additional logic (e.g., report generator 245) may be provided within the secured container 205 to measure or assess the application 210 and its container 205 (e.g., during the creation of the container 205 and the loading of the application 210 in the container 205). The report generator 245 may generate report information to identify the measurements of the application and/or container, together with other attributes and information. Additionally, the report generator 245 may encode at least a portion of the report data to prove the authenticity and integrity of the report data. For instance, a data integrity code may be included in the report, such as a MAC or HMAC, the data integrity code generated using a secret or key rooted in hardware of the host system (e.g., a session key generated and stored in secure memory of the host system). In another example, all or a portion of the report data may be encrypted or signed using a private key associated with the host hardware, among other example implementations. The report may be passed by the report generator 245 to a quote creator (e.g., 250a-c) implemented on the host system. The quote creator 250a-c may utilize the report to generate a quote, which includes the report information and is signed by a secure quoting key of the quote creator.

In one implementation, a report generator 245 may make use of a specialized instruction set of a processor device 216 of the host system 105. For instance, a report generation 226 instruction may be provided, which the report generator 245 may call (e.g., through an API corresponding to the processor's 216 instruction set) to cause the processor 216 to access a hardware-based key or other secret (e.g., stored in fuses 258) and generate a data integrity code from the secret. The report generation instruction, in one example, may be a privileged instruction, such as a Ring 0 instruction, among other alternative implementations. The report generation instruction may be defined to include parameters (e.g., provided by the requesting report generator (e.g., 245) to indicate an identifier of the corresponding secured container and, in some cases, measurement of the secured container (e.g., 205) and/or its contents (e.g., 210, 215) as determined by the report generator 245. Additionally, the report generator 245 may provide a nonce value, which is to be signed by the processor, or other data for use by the processor 216 in generating a report for the secured container. In some cases, the report generation instruction 226 may provide the report as an output for access by the requesting secured container. In other examples, the report may be provided as an output to a handler 265*a-b*, which is to be used to handle quote requests that include these reports, among other example implementations.

A report generated by report generator 245 (e.g., through the use of a report generation instruction 226) may be generated according to a defined format and the format may enable the report to be decoded and utilized by any one of multiple different types of quote creators 250*a-c* (e.g., quote creators implemented using any one of multiple different technologies) to generate a corresponding quote. For instance, a quote creator (e.g., 250*a*) may be implemented as logic resident in the host processor 216 (e.g., to support one or more corresponding instructions in the instruction set of the host processor 216 capable of accessing a quoting key provisioned on the host and signing the report). For instance, a quote generation instruction 250*a* may take parameters such as an indication of a reference to a corresponding report, an identification of the key used to sign the report, an indication of the quoting key to be used to sign the quote, among other example parameters. Execution of the quote generation instruction 250*a* may result in a quote being generated for the report, which may then be provided (e.g., in shared memory) for access by a corresponding secured container to allow use of the quote in an attestation of the secured container. In one example, the quote generation instruction 250*a* may be a privileged (e.g., supervisor level) instruction, such as a Level 0 instruction, among other examples.

In another alternative example, logic implementing a quote creator (e.g., 250*b*) may be provided in a secure software enclave. Secure enclaves can be launched using a hardware platform (e.g., 105) enabled with secure memory and/or secure processor resources, including corresponding instructions, to enable a protected software process, which may be equipped with logic to inspect a report received from a report generator (e.g., 245) and verify that the report includes a valid data integrity code. Generally, secure enclaves (and other secured enclaves described herein) can adopt or build upon principles described, for instance, in the Intel® Software Guard Extensions (SGX) Programming Reference, among other example platforms. Upon verification of the authenticity of the report (e.g., that the report was generated by a trusted report generator based on the data integrity code), the enclave can access a hardware-rooted quoting key and generate a signed quote based on the report. In one example implementation, a software-based quote creator (e.g., 250*b*) may utilize instructions (e.g., 228) provided in the instruction set of the processor 216 utilized to implement the quote creator 250*b*. In one example, a report verification instruction 228 may be provided through which a software-based quote creator 250*b* (which may not have access to the data integrity code or underlying hardware-based secret(s) used to derive the integrity code) may perform verification of a report included in a quote request. For instance, an example quote creator 250*b* may call the report verification instruction 228, which may include as a parameter the report the quote creator 250*b* has received in a corresponding quote request. The processor 216 may (using logic 228) execute the report verification instruction 228 to identify the data integrity code included in the report and verify that the data integrity code is the proper data integrity code used within the system 105 and/or for this particular report. The processor 216 may then output a result (e.g., a bit or flag to indicate whether verification of the report was successful or not), among other example implementations. In some examples, the report verification instruction may be an instruction of any ring or privilege level, among other examples.

In yet another example, the quote creator (e.g., 250*c*) may be implemented in a hardware element (e.g., 255) separate from the host processor (e.g., 216), such a processor device (e.g., a security co-processor, such as a trusted platform module (TPM) or other device) equipped with hardware and/or firmware to validate a data integrity code in a received report and perform cryptographic processes to generate a quote signed using a quoting key securely accessed by the hardware element 255. In some implementations, hardware element 255 may be a purpose-built device specifically configured to serve as a quote creator for a platform, among other example implementations. The quoting key of such an implementation of the quote creator, in one example, may be tied to the device 255, rather than the platform (e.g., 105), although a trust relationship may be defined (implicitly or explicitly) between the co-processor device 255 and the host processor 216 or the host system 105, generally, such that a quote signed by the quote creator 250*c* of the device 255 for a secured container 205 hosted on the host system 105 may equally serve to attest to the trustworthiness of the secured container 205 and/or its contents (e.g., 210, 215, etc.), among other examples.

In each of the examples discussed above, the quote creator (e.g., 250*a-c*) may be implemented to validate a data integrity code generated by the report generator 245 using, for instance, a session key rooted in hardware of the host platform. For instance, a key generator 235 may be provided on the host platform 110, which may access a secure, hardware-based secret (e.g., a secret set in fuses 258 of the host system 110) and generate one or more session keys during the boot session of the host system 110. In some examples, the key generator 235 may generate a unique key for each secured container 205 launched using the host system 110. In other examples, a single key may be generated to be used for all secured containers hosted by the system 110 in the session. In some implementations, a quote creator (e.g., 250*a-c*) may be granted access to the session key to allow the quote creator to generate the same data integrity code (as would be expected in reports received during the session) using the session key, such that the quote creator is able to validate the data integrity codes of reports received at the quote creator (e.g., 250*a-c*). In other examples, the quote creator may not be granted direct access to the session key (e.g., a MAC key or HMAC, etc.), but may utilize instructions (e.g., 228, such as discussed above) to allow the quote creator to call to the host processor 216 (or other trusted logic on the host system) to request that the current data integrity code be provided for the quote creator in connection with validation of the report. This may allow for instances where it may be undesirable to grant a quote creator direct access to the session key (e.g., such as in instances where the quote creator (e.g., 250c) is on a device 255 separate from the host processor 216, or where the quote creator (e.g., 250b) is implemented in software, rather than hardware, among other examples.

Quote creators (e.g., 250a-c) may be equipped with a quoting key that may be used by the quote creator to create a signed quote to attest to the trustworthiness of a secured container 205 and its contents. In some implementations, the quote creator may be equipped with, or access, a quoting key that has been pre-provisioned or pre-generated on the host system based on a hardware-based secret on the host system, such as a secret in secured memory or set in hardware (e.g., in fuses 258) at manufacture. In some cases, such as quote creators implemented in secure software enclaves (e.g., a quoting enclave 250b) or on devices (e.g., 255) peripheral to the host processor 216, the host system may be provided within instructions to securely provision the quoting key on one or more quote creators provided on the host system.

A quote creator (e.g., 250a-c), upon generating a quote from a report received from a given report generator (e.g., 245) of a secured container (e.g., 205), may return the quote to the quote to the container (e.g., 205) for use by the container in an attestation with another software component or system. In some implementations, a secured container 205 may be additionally provided with quote consumption logic 260 to receive quotes generated by a quote creator (e.g., 250a-c) and use the quote to perform an attestation. In some implementations, the quote consumption logic may be utilized by an application or another software component (e.g., 210) hosted within the secured container 205 to establish a trust relationship with a backend service or data store (e.g., 135). The backend service may receive the quote and attempt to validate the quote by querying a certification system 145, which may access a certificate corresponding to the quoting key used to sign the quote to determine that the quote is from a host platform equipped with functionality to implement a secured container and that measurements of the secured container contents determined by the secured container are reliable and may be trusted. Upon determining that the secured container is legitimate, the backend system 140 may proceed with the establishment of a secure communication channel, granting of privileged access, sharing of sensitive data (e.g., a decryption key), and other privileged transactions with the software components (e.g., 210) hosted in the secured container 205.

In some implementations, a host system 105 may be provided with a handler (e.g., 265a, 265b) to act as an interface between secured containers 205 (e.g., including report generators (e.g., 245) and quote consumers (e.g., 260) hosted on each of the secured containers (e.g., 205)) and one or more quote creators (e.g., 250a-c). The handler utility (e.g., 265a,b) may allow the specific implementation of the quote creator to be abstracted away, such that a given secured container implementation may interoperate with potentially any one of multiple different quote creators (e.g., 250a-c), including quote creators of different technologies, quote creators provided on different subsystems of a host system (e.g., 105), among other examples. For instance, rather than configuring a report generator (e.g., 245) to direct quote requests to a specific quote creator, the report generator may be ignorant of or agnostic to the specific implementation of a quote creator, instead directing its quote request to a handler (e.g., 265a,b) on the platform. The handler (e.g., 265a,b) may identify one or more quote creator instances (e.g., 250a-c) available on a host system 105 and determine one of the quote creators to handle the quote request. The handler (e.g., 265a,b) may then send the quote request to the appropriate quote creator and may, when required, tailor the format, protocol, or syntax of the quote request to the requirements of the respective quote creator, among other example features and considerations. The quote creator may return a quote to the handler (e.g., 265a,b) instead of the requesting secured container 205 directly. As such, the handler (e.g., 265a,b) may additionally route quotes received from quote creators (e.g., 250a-c) to the appropriate requesting secured containers.

In some implementations, such as shown in the example of FIG. 2A, a handler (e.g., 265a) may be implemented as a particular component (e.g., 265a) configured to interface with secured containers 205 and quote creators 250a-c implemented on the host system 105. In other (alternative) implementations, such as illustrated in the example of FIG. 2B, the handler (e.g., 265b) may be provided on a container manager used to launch the secured containers, such as a virtual machine manager (VMM) (e.g., 230) or other container manager that is natively configured to interoperate with and communicate with the secured containers, among other example implementations.

In some implementations, multiple quote creators (e.g., 250a-c), of potentially multiple different types, may be provided on a single host system. In such cases, a handler (e.g., 265a,b) may both identify the presence of the quote creators and determine which of the quote creators to use. In some cases, criteria may be utilized by the handler to determine which of multiple available quote creators to use. For instance, different quote creators may possess different cryptographic capabilities, with some representing stronger or more robust capabilities than other quote creators. In some implementations, a handler (e.g., 265a,b) may identify that some quote creators possess superior performance characteristics, such that some quote creators are able to generate quotes more quickly and/or with fewer computing resources. In still other examples, a handler (e.g., 265a,b) may include logic to monitor the performance of various quote creators within the system 105 and determine load and/or availability of quote creators to handle a quote request (e.g., identify that one quote creator is currently busy generating a quote for another quote request (e.g., from another secured container on the host system), while another quote creator is currently free, etc.), among other example considerations and criteria (among combinations of criteria). Upon determining the quote creator to use, the handler may tailor communication of the quote request to the selected quote creator. In other instances, a single quote creator may be implemented on a host system and identified by the handler (e.g., 265a,b). Here again, the handler (e.g., 265a,b) may identify the attributes of the particular quote creator on the host system and adapt quote requests to the quote creator appropriately. In this manner, secured containers may be capable of being run and attested to on a variety of different host platforms utilizing a variety of different quote creator implementations, among other example benefits. Further, in some implementations, a standardized report structure may be defined, which is compatible with and usable by multiple different quote creator implementations to generate quotes from such reports, among other example features.

Figure 4:
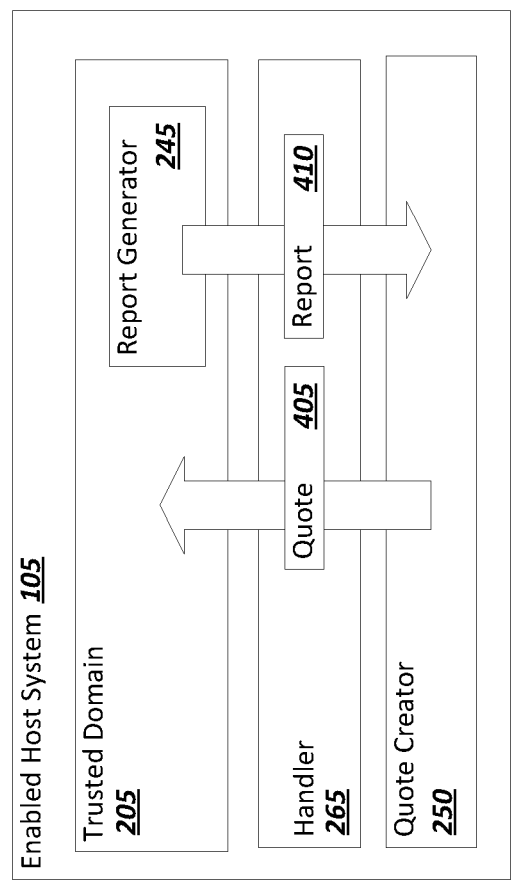
FIG. 4 is a simplified block diagram representing an example host system in accordance with one embodiment.

Turning to FIG. 4, a simplified block diagram 400 is shown illustrating a simplified representation of the generation of a quote 405 for a secured container 205. For instance, a host computing system 105 may be enabled to create and host secured containers 205 and may be additionally configured with quote creator 250 functionality. During creation of a secured container 205 and the loading of various contents (e.g., software components and accompanying data) into the secured container 205, a report generator 245 may measure the secured container 205 and its components and generate a report 410 that includes these measurements. For instance, measurements may identify such characteristics as the type and identifier of the platform processor (e.g., CPU, chipset, etc.), firmware version used by the processor(s), identification and status of any authenticated code modules (ACMs) of the processor(s), presence of trusted boot functionality, firmware of all trusted devices, software versions for any enclave providing security services, type and version of a secured container supported by the platform, type and version of the manager utilities (e.g., of the VMM or other container manager) managing the containers, description of any software components loaded into the container, among other examples. The report may additionally include a data integrity code (e.g., a MAC or HMAC code) to validate the measurements included in the report 410 to a quote creator 250 that is to generate a quote 405 including the contents of the report 410. In other instances, the report generator 245 may use other authentication techniques to verify the integrity of the report, such as signing the report with an encryption key, encrypting the report using an encryption key (e.g., a private key for which the quote creator has a corresponding public key), among other example techniques.

The report generator 245 may send a quote request to a handler 265 on the host system 105, the quote request including the report 410. The handler 265 may identify a quote creator 250 on the host system 105 to handle the quote request, and forward the quote request, with the report 410, to the quote creator 250. The quote creator 250 can validate the report, based on authentication data (e.g., a data integrity code) included in the report 410. If the quote creator 250 is unable to validate the report 410 (e.g., because the report was generated by a report generator that does not have access to the secure session key for the system 105), the quote creator 250 may return a response (to the handler 265) indicating that the validation failed. In cases where the quote creator 250 validates the report 410 in the quote request, the quote creator may sign or encrypt at least a portion of the contents of the report using the quoting key at the quote creator and return the signed quote 405 to the handler 265 for delivery to the secured container for use in attestation of the secured container 205 and its contents.

Figure 5:
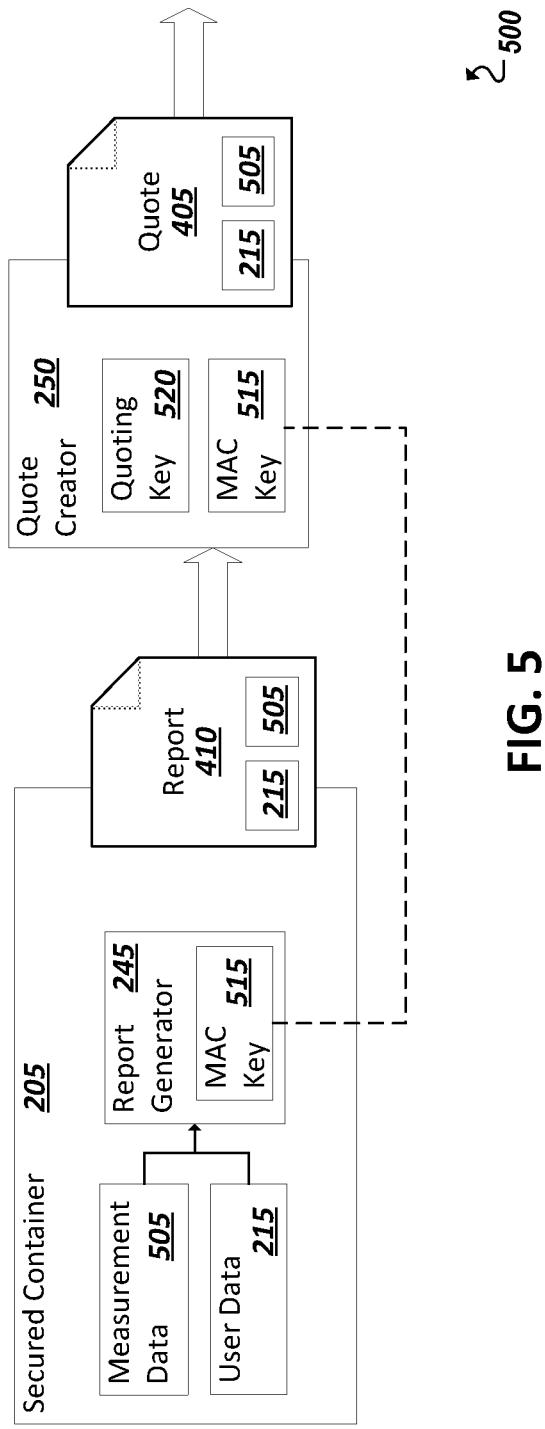
FIG. 5 is a simplified block diagram representing an example host system and quote creator in accordance with one embodiment.

Turning to the example of FIG. 5, a simplified block diagram 500 is shown illustrating a more detailed example of the generation of a quote using an enabled host system. For instance, a secured container 205 may be launched on the host system and include a report generator 245. The secured container 205 may be measured to generate measurement data 505. Further, various user or application-specific data 215 may be generated or provided in connection with the secured container and/or applications or other software components loaded in the secured container. In this example, the report generator 245 may access a MAC key 515 (e.g., generated for a session) and generate a report 410 that includes the measurement data 505 and user data 215. Further, the report generator 245 may generate a data integrity code using the MAC key 515 and include the data integrity code in the report 405.

Continuing with the example of FIG. 5, the report 410 may be sent (e.g., through a handler) to a quote creator 250. The quote creator 250 may likewise have access to the session key 515 in order for the quote creator 250 to validate data integrity codes included in the reports 410 received from report generators 245 of secured containers 205 hosted within the system. In other instances, the quote creator 250 may not have direct access to the MAC key, but may instead utilize an instruction to request a data integrity code to be generated from the MAC key by another component with access to the MAC key (e.g., the host processor), which can then be provided to the quote creator 250 for use in validation of report data integrity codes received at the quote creator 250. The quote creator 250 may further include a quoting key 520 with which the quote creator 250 may generate a signed (i.e., with the quoting key 250) quote 405 (which also includes the measurement data 505 and user data 215). The signed quote 405 may then be returned to the secured container for use in attestation of the secured container.

Figure 6A:
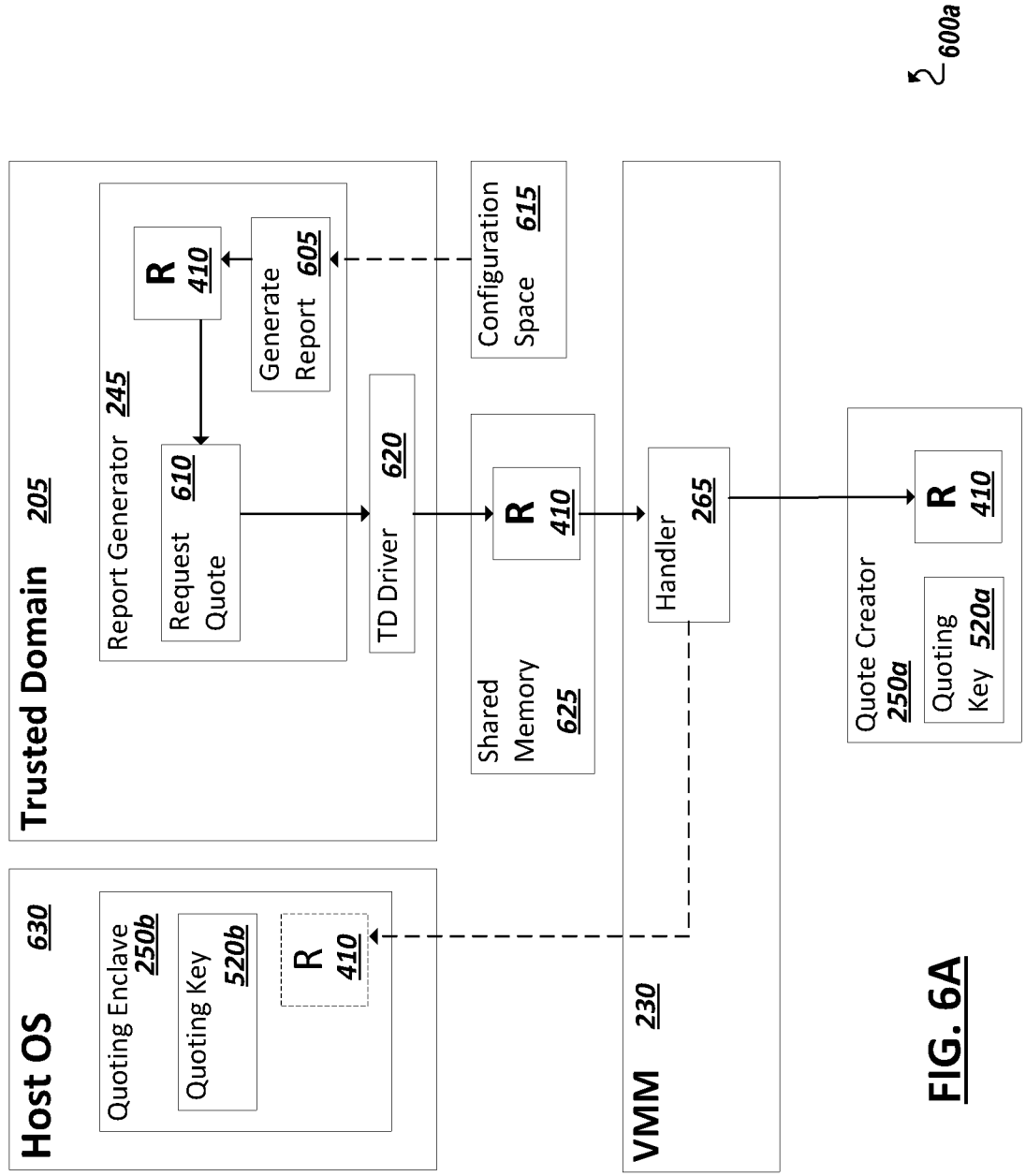
FIGS. 6A-6B illustrate simplified block diagrams representing preparation of an example quote for an attestation.
Figure 6B:
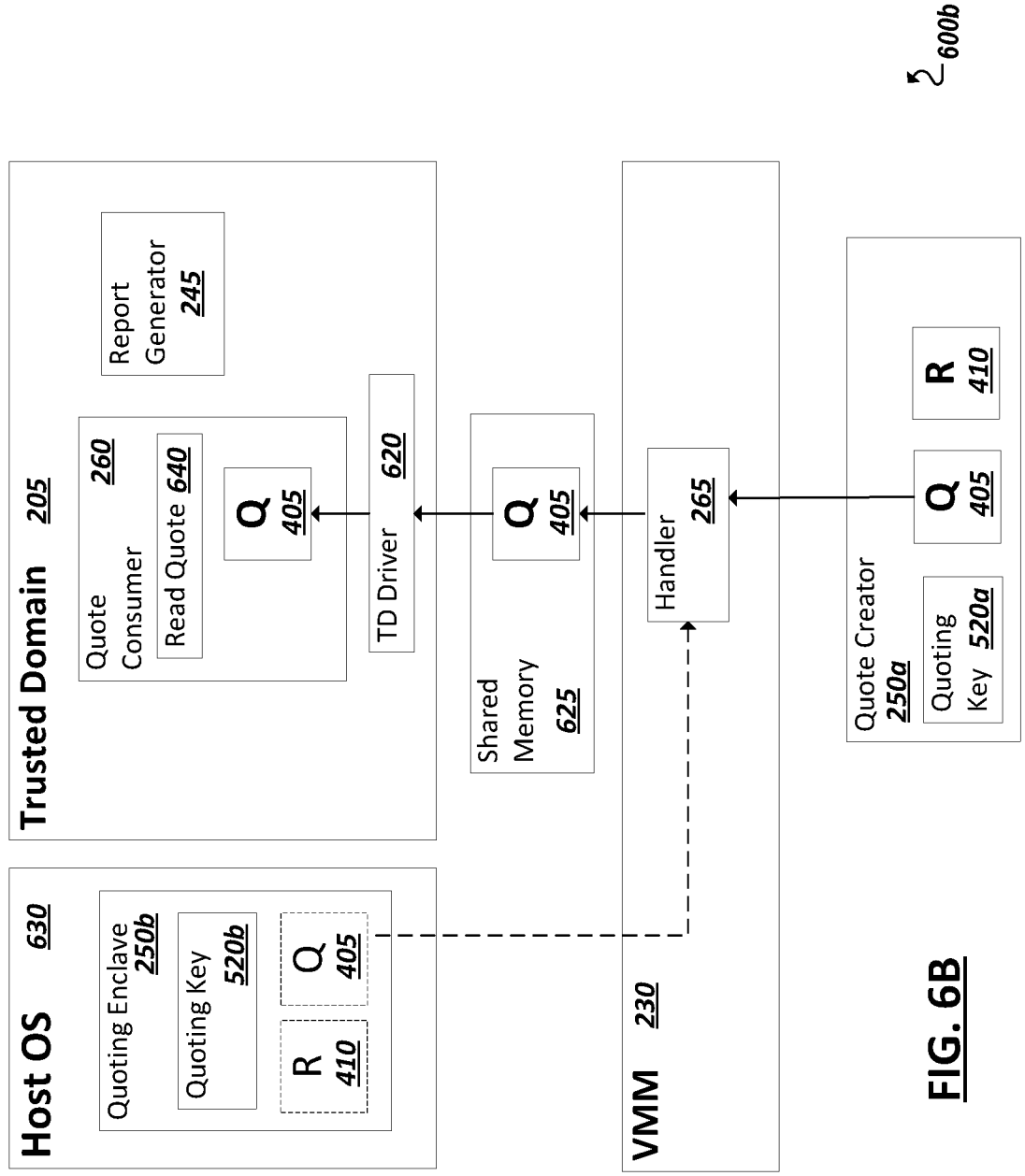

FIGS. 6A-6B are simplified block diagrams 600a-b illustrating another example implementation of the request and generation of a quote using an enabled host system. In this example, such as shown in FIG. 6A, a trusted domain provided by a secured container 205 that includes a report generator 245 including a generate report instruction 605 and request quote 610 instruction. For instance, secure memory may be set aside for the secured container 205 upon creation that includes configuration space 615 where measurements of the secured container 205 are to be stored upon generation (e.g., during and/or following measuring of the secured container 205). The report generator 245 may create the report 410 by accessing the measurements and other data for inclusion in the report R 410.

The report generator in the secured container may further generate a quote request (using request quote instruction 610), which may be forwarded to a handler 265. In this example, the handler 265 is implemented in a VMM 230. The secured container 205 may implemented a trusted domain driver 620 and communicate with the VMM 230 using the driver 620. In one example, communications between the VMM 230 and the handler 265 may be facilitated through shared memory resources 625 of the VMM and secured container 205. The handler 265, upon receiving the report request, including the report R 410, may identify quote creators (e.g., 250a, 250b) capable of generating a quote from the report R 410. As the report R 410 may adopt a report format compatible with any one of multiple different quote creators, the handler 265 may identify that either quote creator 250a (e.g., embodied in logic resident on the host processor) or quote creator 250b (e.g., embodied in a software-based secure enclave launched using the host processor and run in host operating system 630) may be used to generate a quote from the report R 410. Further, each of the quote creators may include a respective quoting key (e.g., 520a, 520b) that is rooted in hardware of the host system and tied to a corresponding certificate.

Turning to FIG. 6B, the handler 265 may send the quote request to one of the quote creators (e.g., 250a). The quote creator 250a may validate the report R 410 included in the request and sign the report using the quoting key 520a of the quote creator 250a to generate a corresponding quote Q 405. The quote creator 250a may then send the quote Q 405 to the handler 265 for delivery back to the secured container 205 (e.g., through shared memory 625 and trusted domain driver 620). The secured container 205 may include quote consumer logic 260 that includes a read quote instruction 640, which may be used to access the generated quote Q 405 (e.g., from shared memory 620), which may then be used (e.g., by an application hosted by the secured container (e.g., VM)) to attest to the authenticity of the secured container and its measurements (e.g., to another system).

Figure 7A:
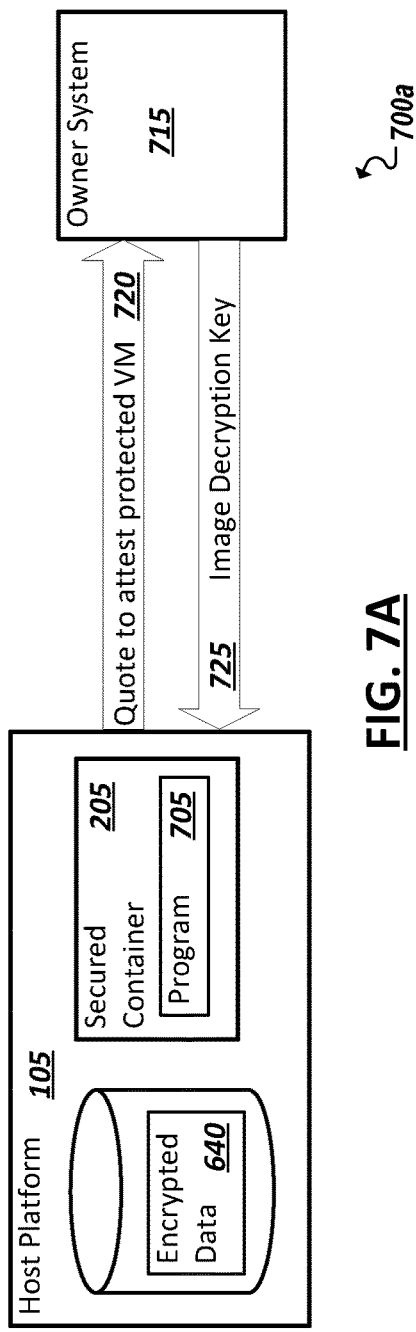
FIGS. 7A-7B are simplified block diagrams showing example uses of attestation in accordance with one embodiment.
Figure 7B:
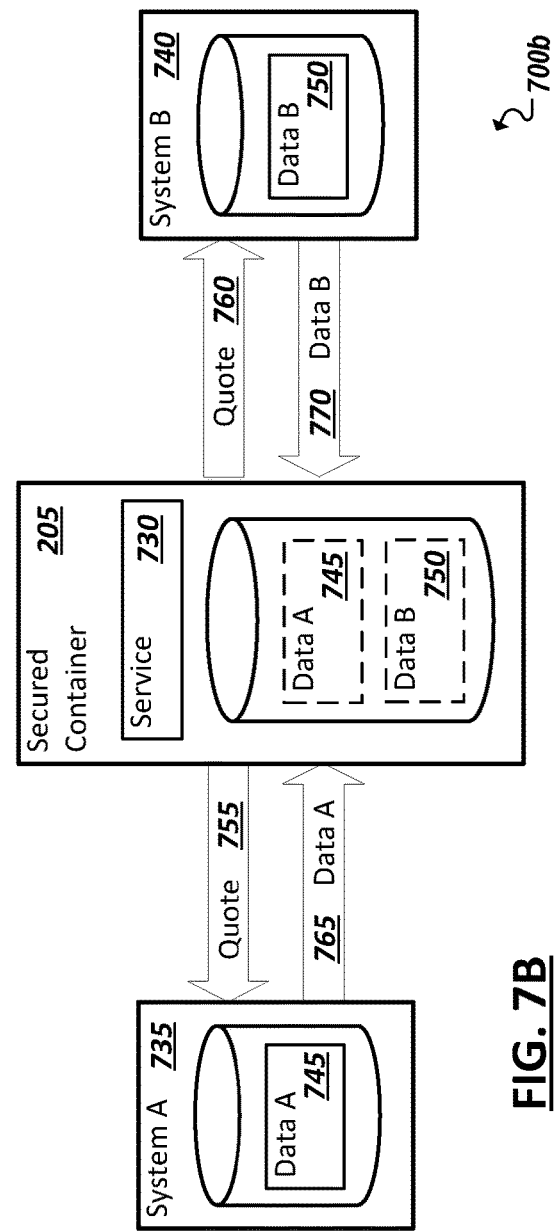

Turning to FIGS. 7A-7B, simplified block diagram 700a-b are shown illustrating example uses of trusted domains provided by enabled host platforms. For instance, in the example of FIG. 7A, a secured container 205 is shown, which has been loaded with a particular program 705 configured to decrypt encrypted data 710. In some cases, the encrypted data 710 may be data resident in an encrypted hard drive on the host system 105. In another example, the encrypted data may be included in a machine image loaded into the secured container 205 itself, among other examples. When the particular program 705 has access to the decryption key corresponding to the encrypted data 710, the particular program 705 can facilitate use of the encrypted data (e.g., within the secured container or outside the secured container on the host system 105). Another system 715 may be a computing system remote from the system 105 hosting the secured container 205 that owns or control access to the encrypted data 710. In this example, the secured container 205 may utilize report generator 245 and quote creator 250 to generate a quote for the secured container 205 and program 705. This quote may be sent 720 to system 715 for validation (e.g., based on the signing of the quote using a certified quoting key associated with a trusted platform). Upon validation, system 715 may establish a secure channel with the secured container and send the decryption key 725 for the encrypted data 710 over the secure channel to the secured container 205. The particular program 705 may use this decryption key to decrypt the encrypted data 710, allowing the data to be run or otherwise used on the host system 105.

Turning to FIG. 7B, another example implementation is illustrated. In this case, a service 730 is loaded onto a secured container 205. Two or more systems 735, 740 may seek to utilize the service to control access, anonymize, and/or perform analytics, searches, or other tasks on data provided by the two or more systems (e.g., to realize privacy preserving data analytics, deep learning, joint data mining, or other applications). For instance, the two systems 735, 740 may each correspond to a separate entity and each may find value is supplementing their own data (e.g., 745, 750) with the other's. The parties may agree to share one another's data, under the premise that access to the other's data is protected using a secured service provided through a secured container (e.g., 205). For instance, data from entity A may be provided to the secured container, and data from entity B may be provided to the same secured container, with a service 730 running in the secured container that is able to provide analytics support that limits each entity from accessing the raw data of the other. For instance, the service 730 may accept search queries and return query results tailored to maintain privacy, intellectual property, or other protections in the data. In another example, the service 730 may perform analytics on the combined data from the two entities, A and B, such as using machine learning or other techniques, to generate results that allow each entity to leverage the combined data without having to give the actual raw data to the other, among other example use cases.

To facilitate the examples introduced in connection with the representation 700b of FIG. 7B, the secured container 205 containing the service 730 may first perform an attestation with each of the system 735, 740, providing respective quotes 755, 760 to each system to indicate that the secured container 205 is implemented using suitable host platform 105 (e.g., equipped with hardware and logic known to implement a secured container) and that the service 730 is, in fact, the service agreed upon by the two entities for managing the use and access of jointly-shared data (e.g., 745, 750) from the entities. Upon successfully attesting to each of the entities' systems 735, 740, the respective systems 735, 740 may each establish a secure channel with the service 730 and provide (at 765, 770) the data (745, 750), to be accessed and used by the service 730 (within the secured container 205). The systems 735, 740 may then communicate with the service 730 to request the service 730 to securely perform queries, analyses, and other tasks using the combined data 745, 750, while the raw data remain protected from direct access by the other entity, among other example use cases.

Turning to FIG. 8, a simplified block diagram 800 is shown representing that multiple different report generators (e.g., 245a-c) of multiple different secured containers may each interface with a handler utility 265 provided on a host system. The handler may facilitate routing of quote requests from the report generators (e.g., 245a-c) and the corresponding quotes from one or more quote creators (e.g., 250a-c) sent in response to the quote requests. Each of the report generators (e.g., 245a-c) may generate reports according to a defined format (e.g., 805). The different report generators (e.g., 245a-c) may provide varying information in their respective reports (e.g., in accordance with the version of the secured container and/or respective contents of the container). Further, the defined report format may be compatible with and consumable by any one of multiple different quote creators 250a-c (e.g., potentially implemented using a variety of different technologies). This may enable substantial flexibility and variability in systems instrumented to support secured container domains and quote generation to perform attestation of the secured container. For instance, any one of potentially multiple different models of processor platforms configured to support trusted domains may be combined with any one of potentially different quote creator modules to implement and attest to trusted domains. In some instances, as noted above, the processor platform supporting the creation and hosting of secured container may also provide the logic implementing the quote creator, among other example implementations.

Figure 9:
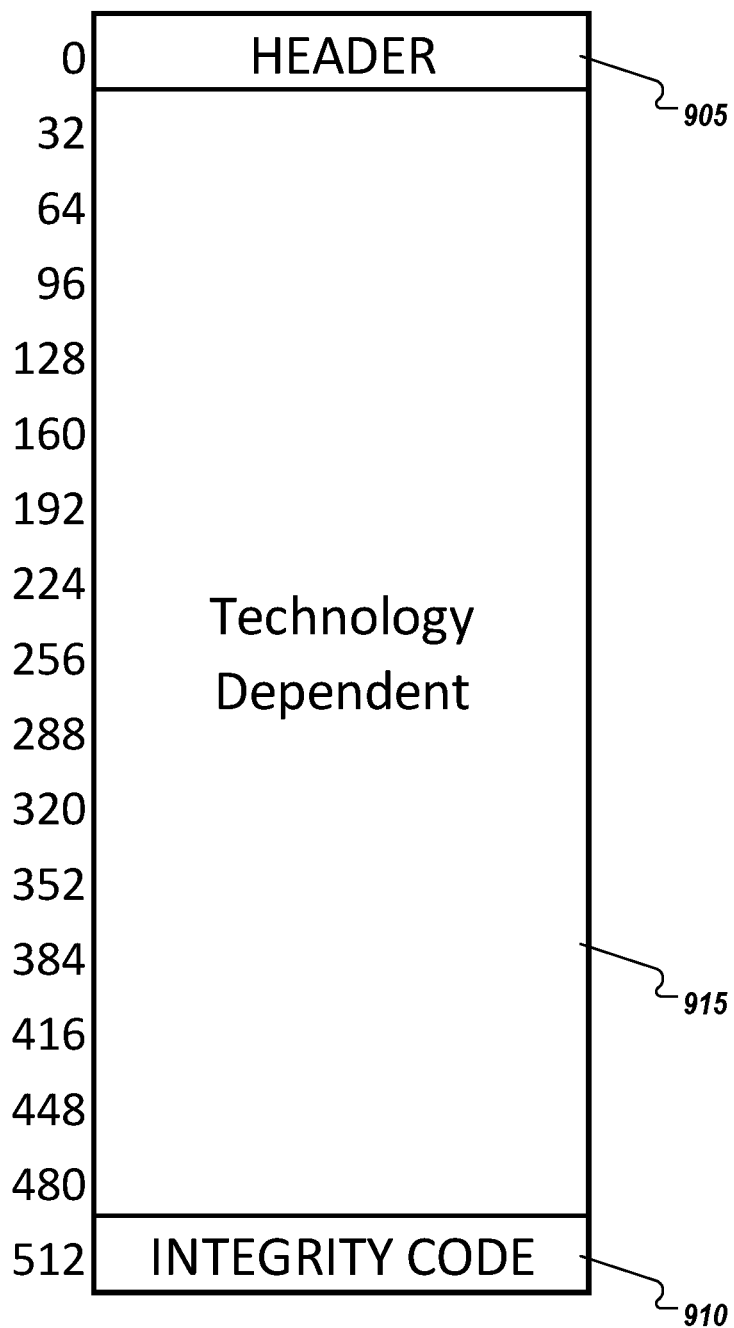
FIG. 9 is a block diagram of an example report format for use by any one of multiple different quote creators.

Turning to FIG. 9, a simplified representation of an example implementation of a standardized report format 900 is shown. As noted above, reports generated by report generator logic within instances of secured containers implemented on enabled hardware may be according to a standardized report format 900. Further, report generation logic in other secured execution environments, such as secure-enclave-based report generators (e.g., SGX reports) and other examples, may also generate reports according to the defined format. This may enable these other secured execution environments to also utilize quote creators on the same platform (e.g., with a combination of different secured execution environments (e.g., secured containers and secure enclaves, etc.) being launched on the same platform and leveraging the same quote creator resources).

In one example implementation, illustrated in FIG. 9, a defined report format of a defined length (e.g., 512 bytes) may be defined. A first portion (e.g., the first 32 bytes) of the report format may be defined to be the header 905 for the report. The header 905, among other information, may identify the type of technology of the report generation logic used to generate the report and may include a type number and version number, among other information. The report format may further include a portion 910 (e.g., the last portion (e.g., the last 32 bytes)) to include a data integrity code (e.g., a MAC). The remaining portions 915 of the report format may be reserved to include measurement information and other data for inclusion in the report. The portion 915 may include a variety of different information, including a variety of fields, which may be specific to or based on the contents of the secured container or the implementation of the secured operating environment (e.g., secured container or secure enclave) being described in the measurements to be included in the report, among other example information. It should be appreciated that the report format shown in FIG. 9 is presented as but one possible example format and that other, different standardized report formats may be utilized without departing from the scope of this disclosure. For instance, smaller or larger reports and report portions may be defined, different ordering of report portions may be defined (e.g., with the data integrity code immediately following the header), among other variations.

FIGS. 10A-10E are simplified flowcharts 1000a-e illustrating example techniques utilized during flexible attestation in accordance with at least some embodiments. For instance, in FIG. 10A, a hardware-based secret may be generated 1002, such as a session key that may be utilized to generate 1004 and validate data integrity codes to be included in reports generated on a host platform in connection with an attestation of a secured environment, such as a trusted, or "secured", container. The secured container may be created 1006 to include report generation logic configured to measure 1008 the secured container and its contents. The report generation logic may further be configured to access or even generate (e.g., 1004) a data integrity code (e.g., a MAC or HMAC) from the hardware-based secret. The report generator may generate 1010 a report according to a defined format that is consumable by multiple different implementations of quote creator logic resident on the host system, including quote creators of different types and technologies. This assortment of quote creators, while potentially different in form and function, may nonetheless be standardized in the sense that each is capable of using reports generated according to the standardized format to generate quotes for use in attestations. Indeed, upon generating the report 1010, a quote request may be generated and sent 1012 to one of the one or more quote creators on the host platform, the quote request including the generated report. The quote creator may generate a quote from the report, the quote signed at the quote creator using a hardware-rooted asymmetric quoting key. The quote may be returned to and received 1014 at the secured container and may be used 1016 (e.g., by one or more software components hosted in the secured container) to perform an attestation of the secured container and its contents.

Figure 10A:
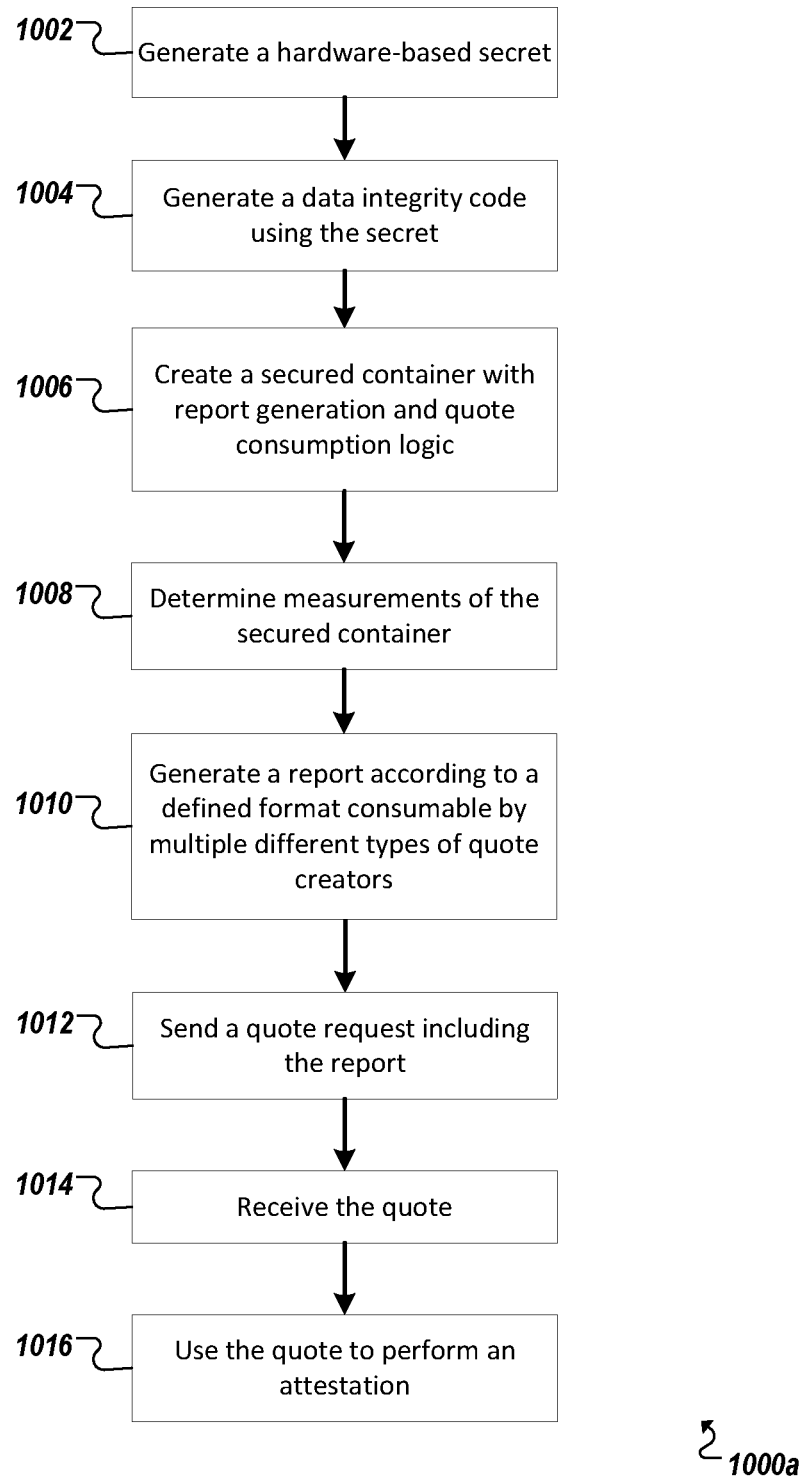
FIGS. 10A-10E are flowcharts showing example techniques utilized during flexible attestation in accordance with at least some embodiments.
Figure 10B:
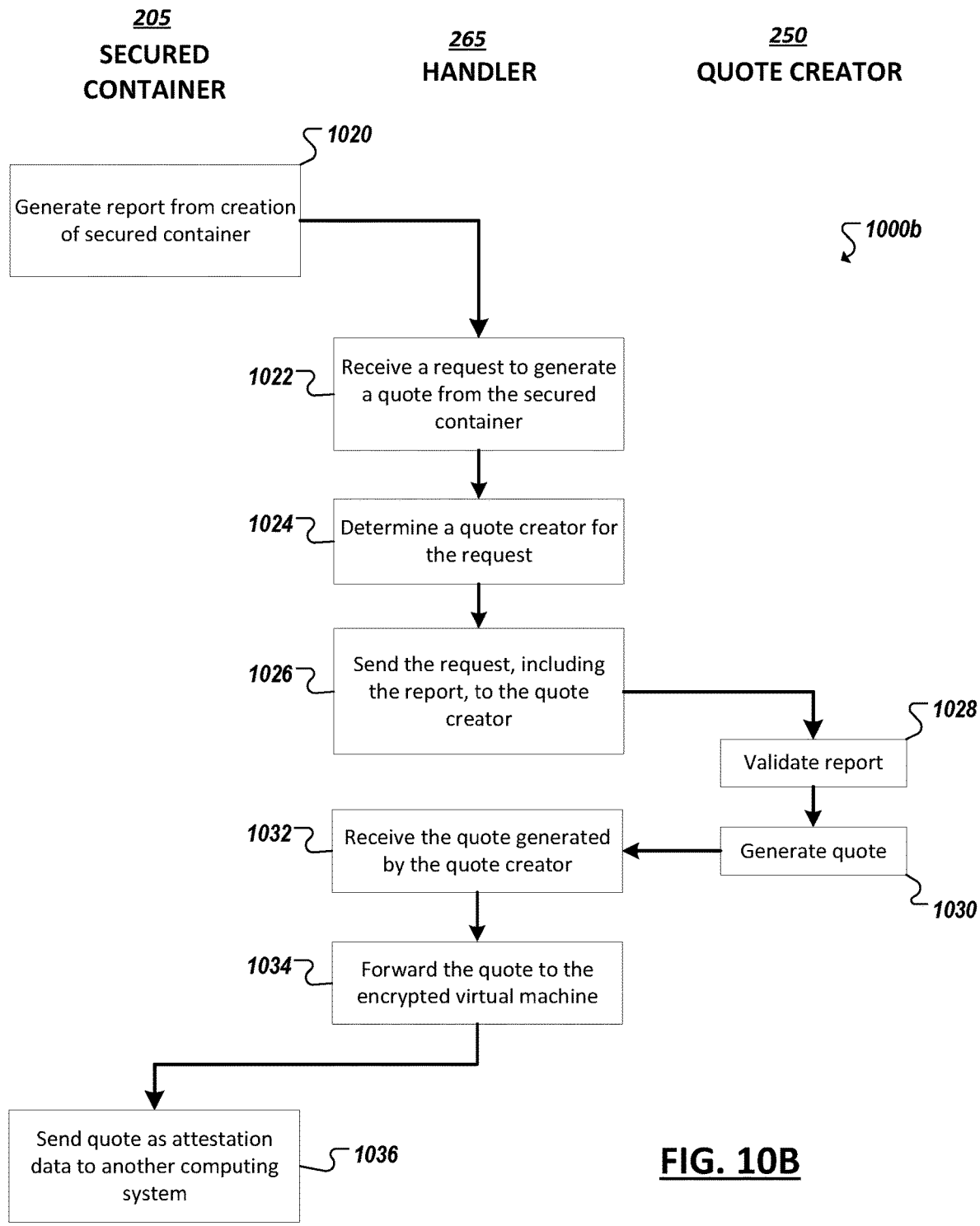

Turning to the example of FIG. 10B, an example technique is shown utilizing example handler logic 265. For instance, a report may be generated 1020 by report generator logic resident in a secured container 205 that includes measurements of the secured container 205 taken during creation of the secured container 205. The report may be included in a quote request sent from the secured container 205 to the handler 265 (at 1022). The handler can determine 1024 a quote creator on the host platform to handle the quote request and may forward 1026 the quote request to the selected quote creator 250 for processing. The quote creator 250 may receive the quote request with the report and may validate 1028 the report based on a data integrity code included in the report. If the report is validated 1028, the quote creator 250 may generate 1030 a signed quote (using an asymmetric quote signing key), where the quote key having a certificate mapping the signature back to the host platform. The quote creator 250 may return (at 1032) the quote to the handler 265, which may identify that the quote corresponds to an earlier quote request from secured container 205. Accordingly, the handler 265 may forward 1034 the quote to the secured (or "trusted") container 205 for use, for instance, by a software component run within the secured container. For example, the quote may be used as attestation data, with the quote being sent 1036 from the secured container 205 to another computing system to attest to the other computing system that the secured container (and its contents) are trustworthy.

Figure 10C:
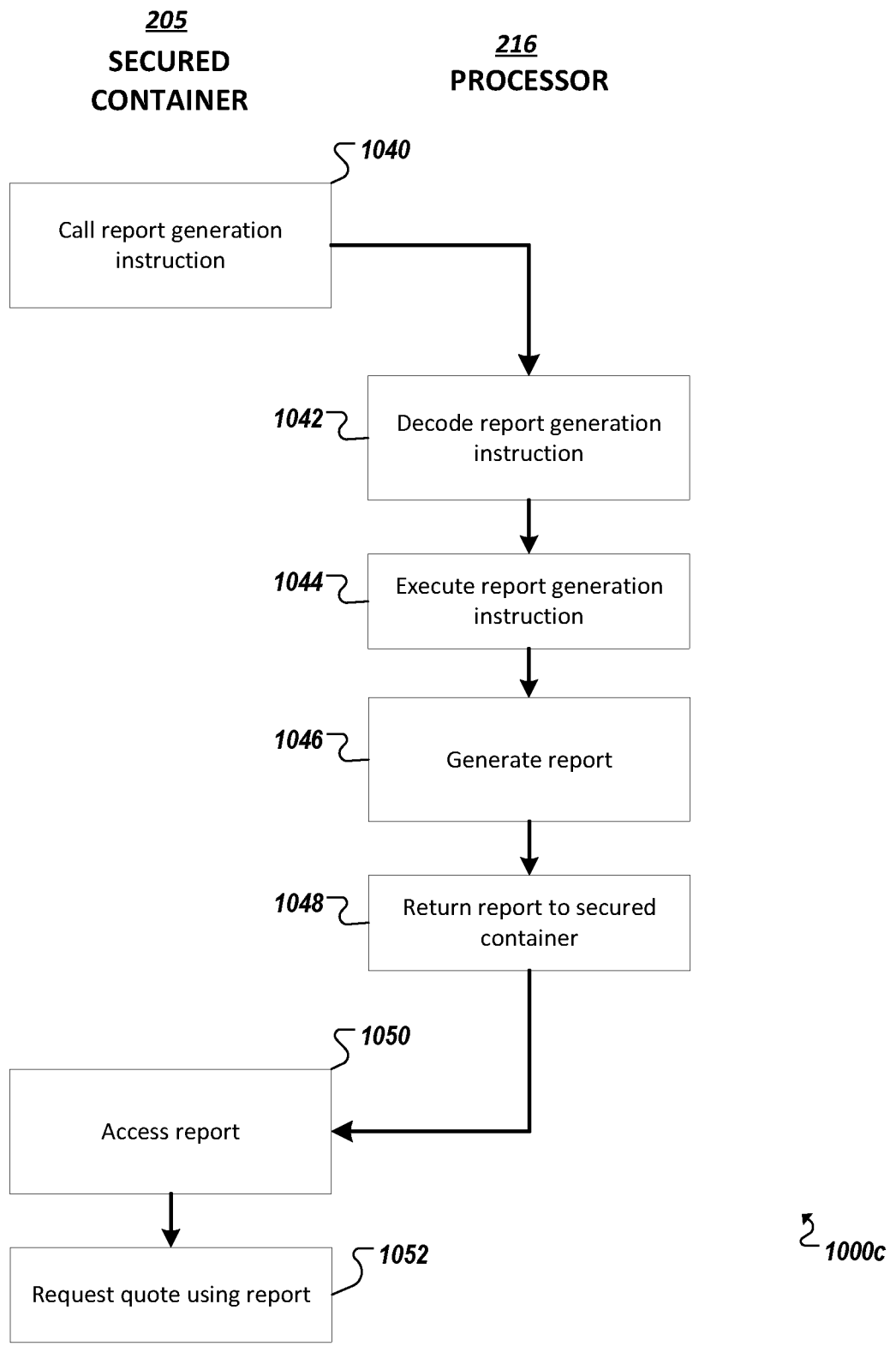

Turning to the example FIG. 10C, a processor 216 may be equipped with an instruction set to support attestation of a secured container. For instance, a secured container 205 (e.g., using report generation logic) may call 1040 a report generation instruction of the processor 216. The processor 216 may decode 1042 the report generation instruction and execute 1044 the decoded instruction using one or more execution units. The processor 216 may perform one or more operations to generate 1046 a report (e.g., corresponding to one or more parameters included in the call, such as measurement of the secured container 205). The report may be generated 1046 according to a defined format that enables the report to be potentially consumed by any one of multiple different implementations of a quote creator present at the host system. The generated report may then be returned 1048 (e.g., by writing the report to memory for access by the secured container 205 (or in some cases directly by the handler handling quote requests of the secured container in response to the report call 1040). In this example, the secured container 205 may access 1050 the generated report and use the report in a quote request 1052 (which may be sent through a handler to a particular quote creator available on the system).

Figure 10D:
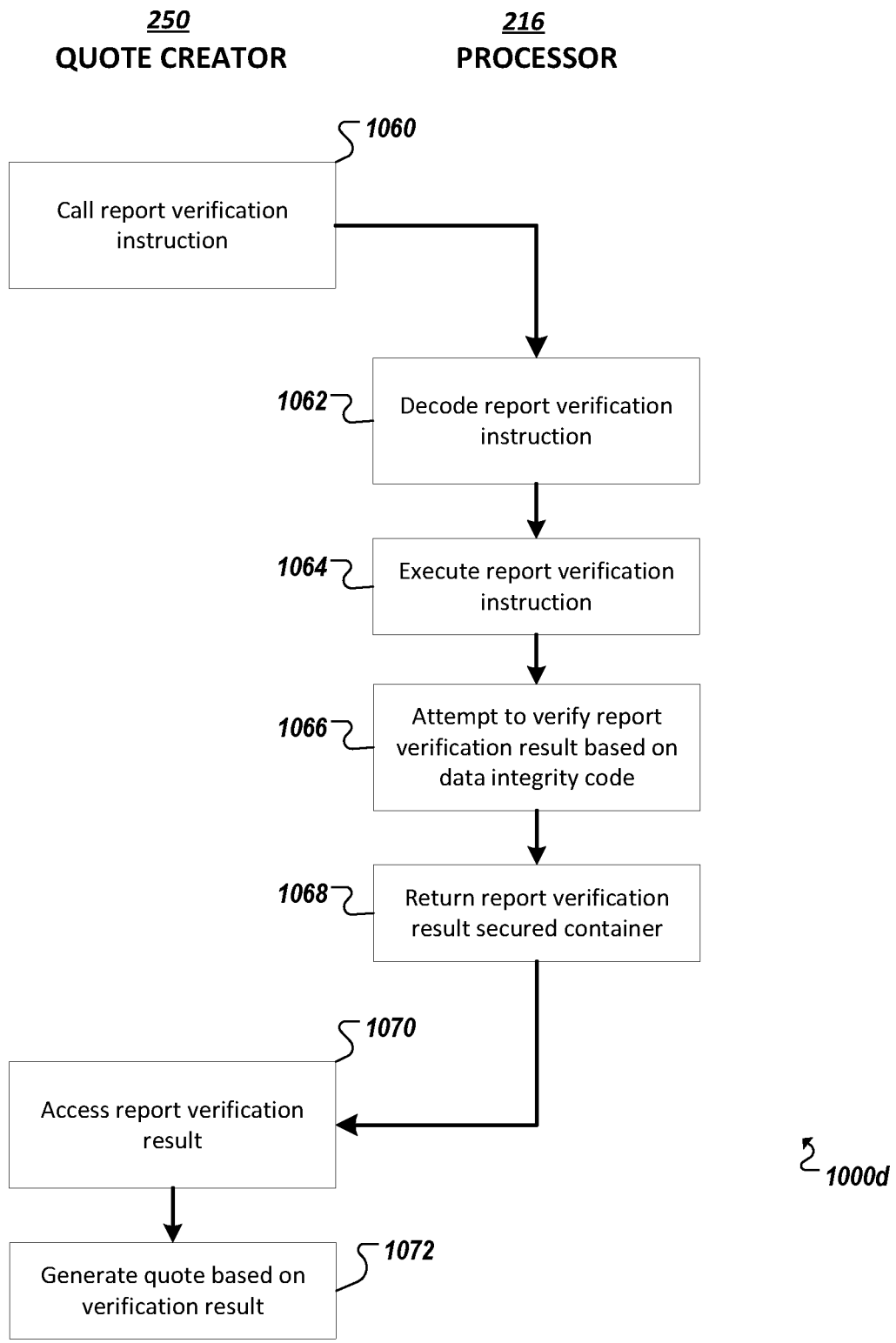

In the example of FIG. 10D, a processor 216 supporting secured container attestation may be provided with additional instructions. For instance, quote creator 250 may call 1060 a report verification instruction provided in the instruction set of processor 216. The processor 216 may decode 1062 the report generation instruction and execute 1064 the decoded instruction using one or more execution units. Execution of the instruction can cause the processor 216 to perform one or more operations including attempting 1066 to verify a report (e.g., referenced in the instruction) on behalf of the requesting quote creator 250. The verification may be based on a data integrity code included in the report. The processor 216 may generate 1068 a result of the report verification to indicate to the requesting quote creator 250 whether or not the report has been verified. The quote creator 205 may access 1070 the report verification result and may generate 1072 a signed quote based on the report of the report verification result was positive, among other examples.

Figure 10E:
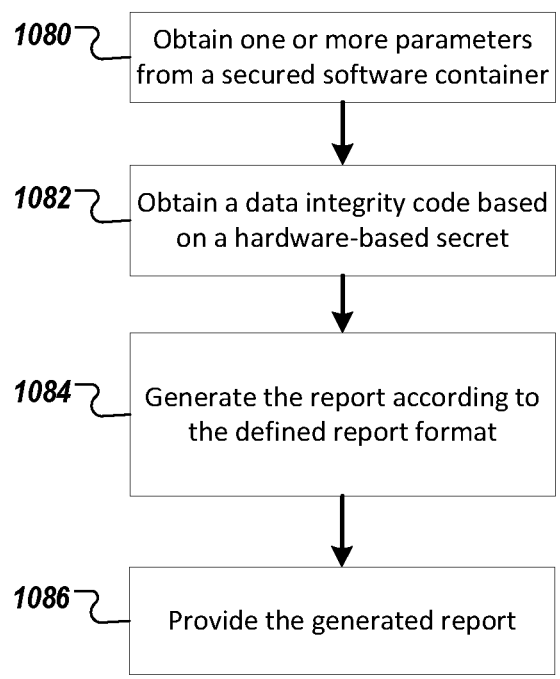

In the example of FIG. 10E, a flow diagram 1000e of a process to be performed by a processor to execute an instruction for a report generation operation. After starting the process, one or more parameters may be obtained 1080 from a secured software container. A data integrity code may be obtained 1082 based on a hardware-based secret and report may be generated 1084 according to a defined report format, the report including the data integrity code. The report may then be provided 1086 (e.g., in a register or other memory for access and use by a quote creator or other component of a system).

FIGS. 11-17 detail exemplary architectures and systems to implement embodiments of the above (such as the processors utilized in the neuromorphic computing device implementing the example SNNs described above). In some embodiments, one or more hardware components and/or instructions described above are emulated as detailed below, or implemented as software modules. Indeed, embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Figure 11:
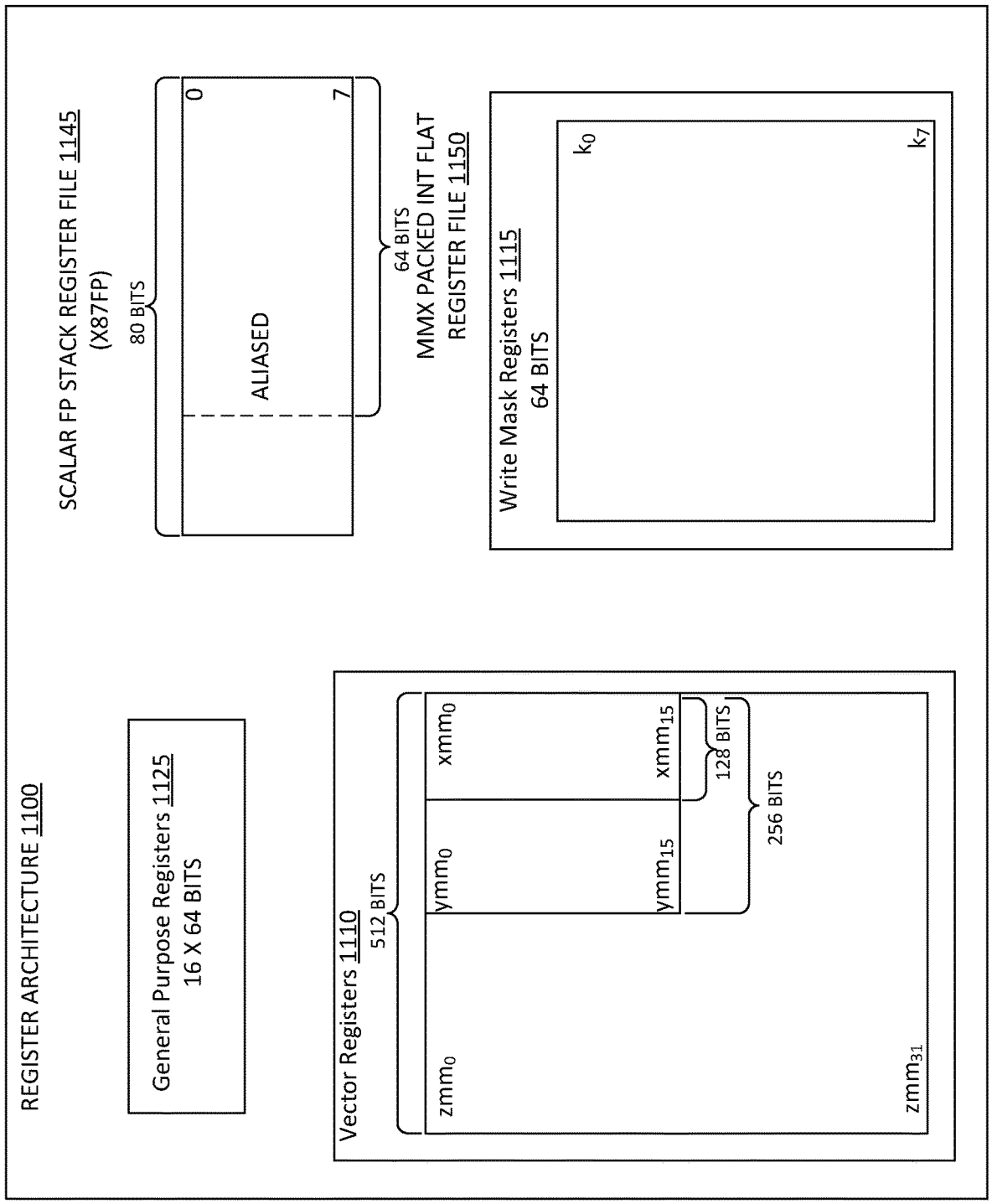
FIG. 11 is a block diagram of a register architecture according to one embodiment of the invention.

FIG. 11 is a block diagram of a register architecture 1100 according to one embodiment of the invention. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

In other words, the vector length field selects between a maximum length and one or more other shorter lengths, where each such shorter length is half the length of the preceding length; and instructions templates without the vector length field operate on the maximum vector length. Further, in one embodiment, the class B instruction templates of the specific vector friendly instruction format operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-12B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 13B:
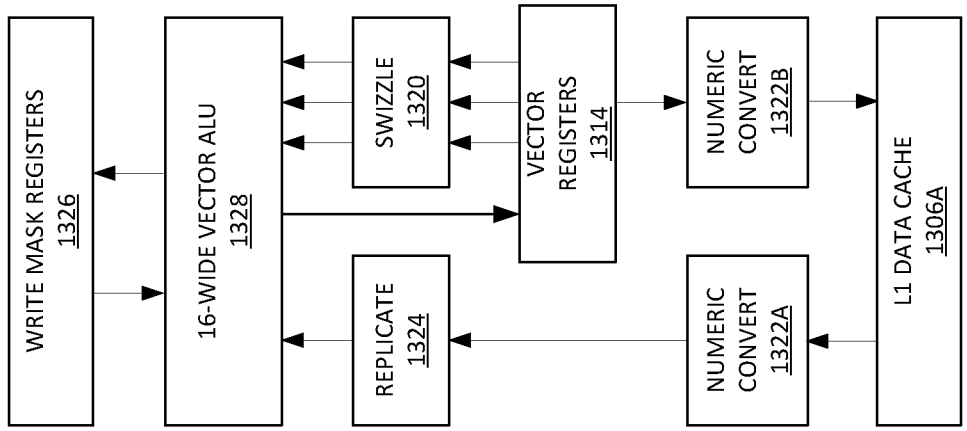
FIG. 13A-13B illustrate a block diagram of a more specific exemplary in-order core architecture, which core would be one of several logic blocks (including other cores of the same type and/or different types) in a chip.
Figure 13A:
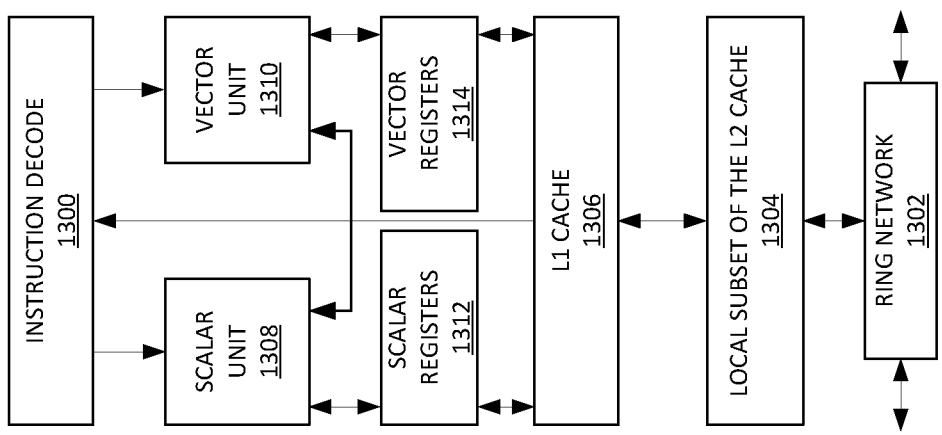

FIGS. 13A-13B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the invention. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the invention may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the invention. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
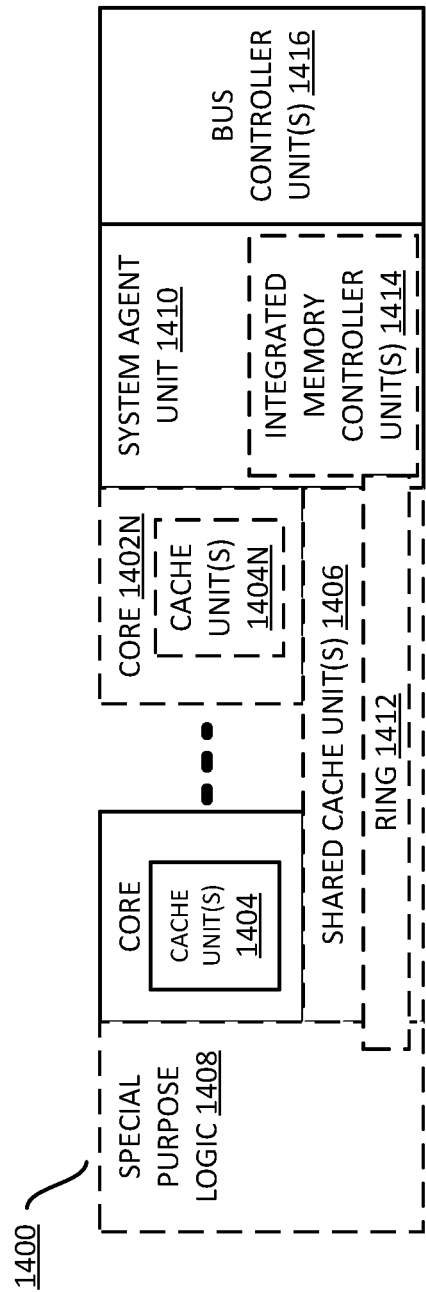
FIG. 14 is a block diagram of a processor that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408, the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402A-N.

In some embodiments, one or more of the cores 1402A-N are capable of multithreading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
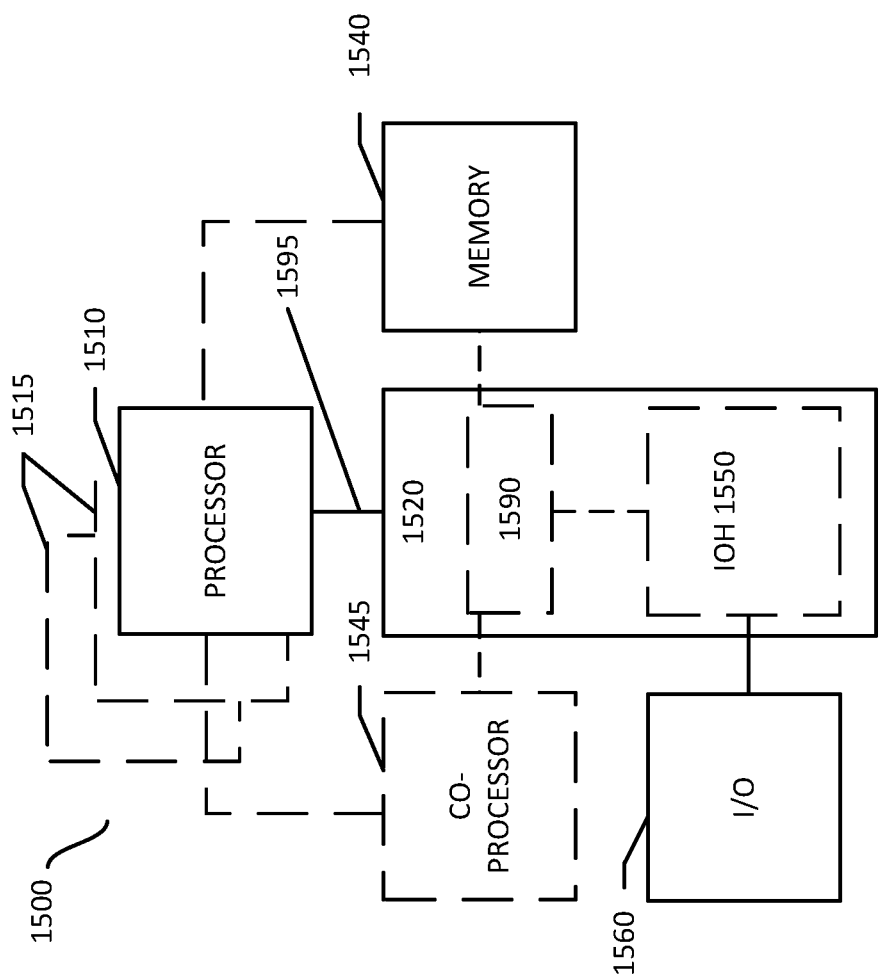
FIGS. 15-18 are block diagrams of exemplary computer architectures.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
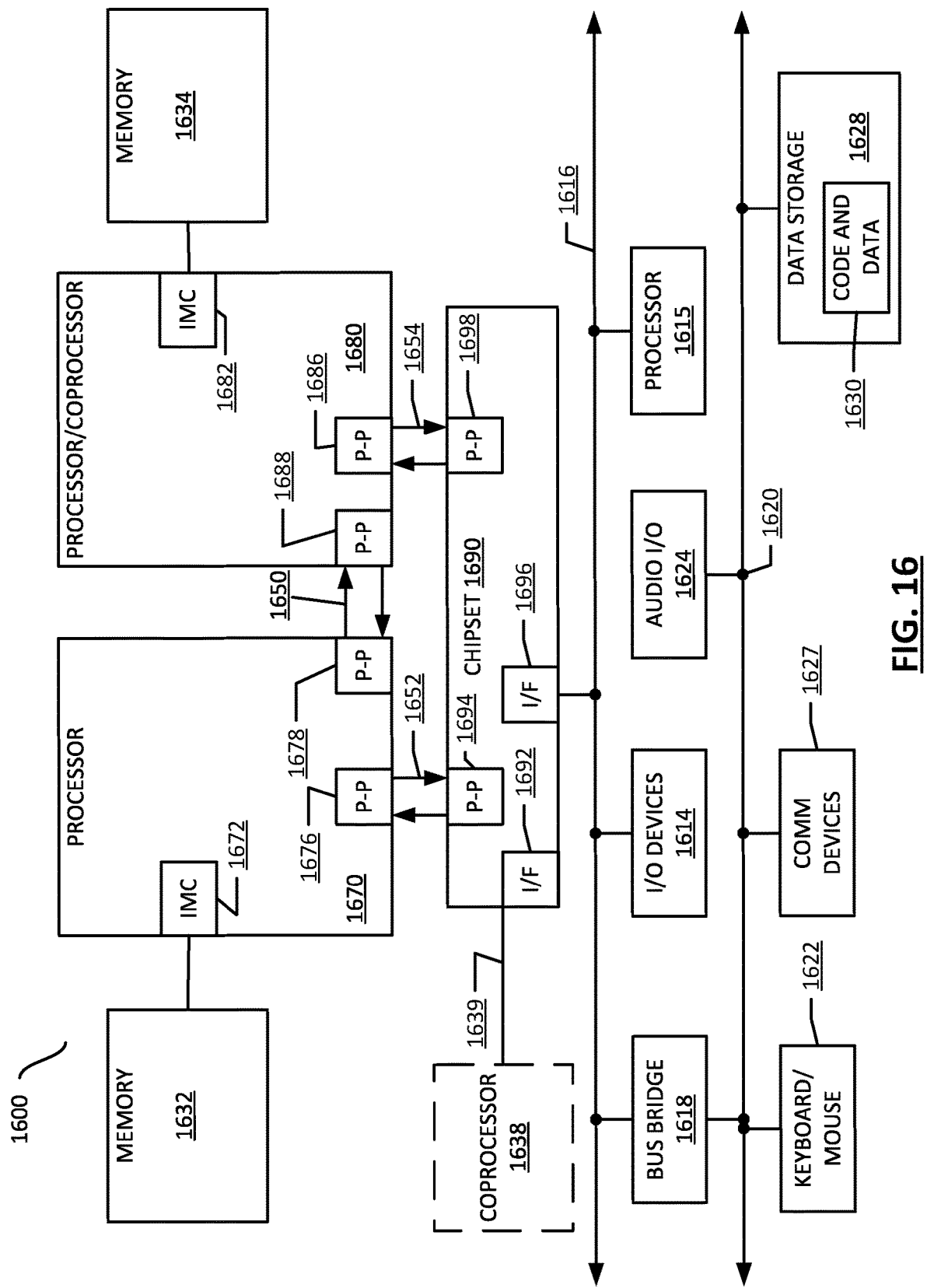

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
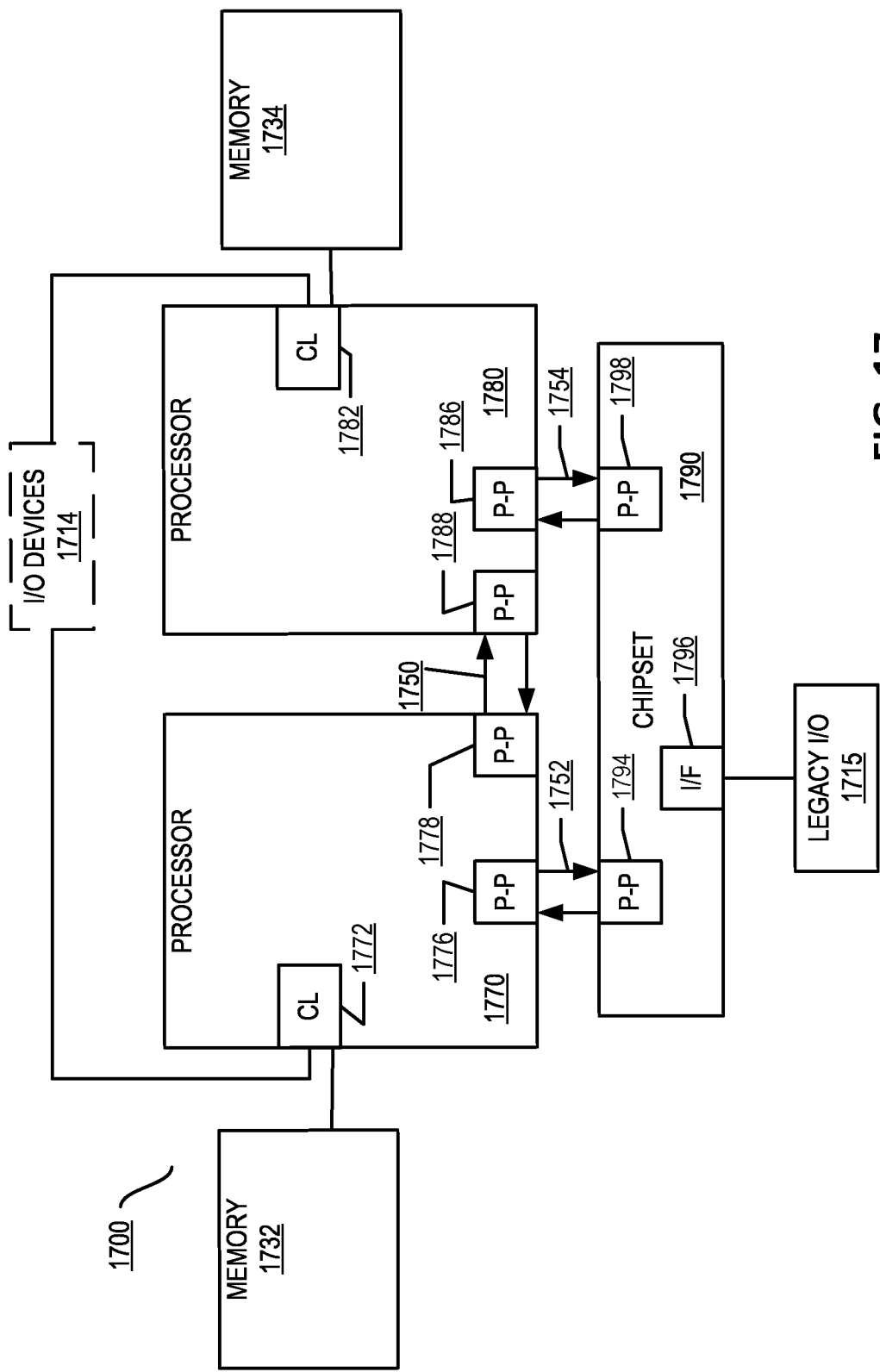

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
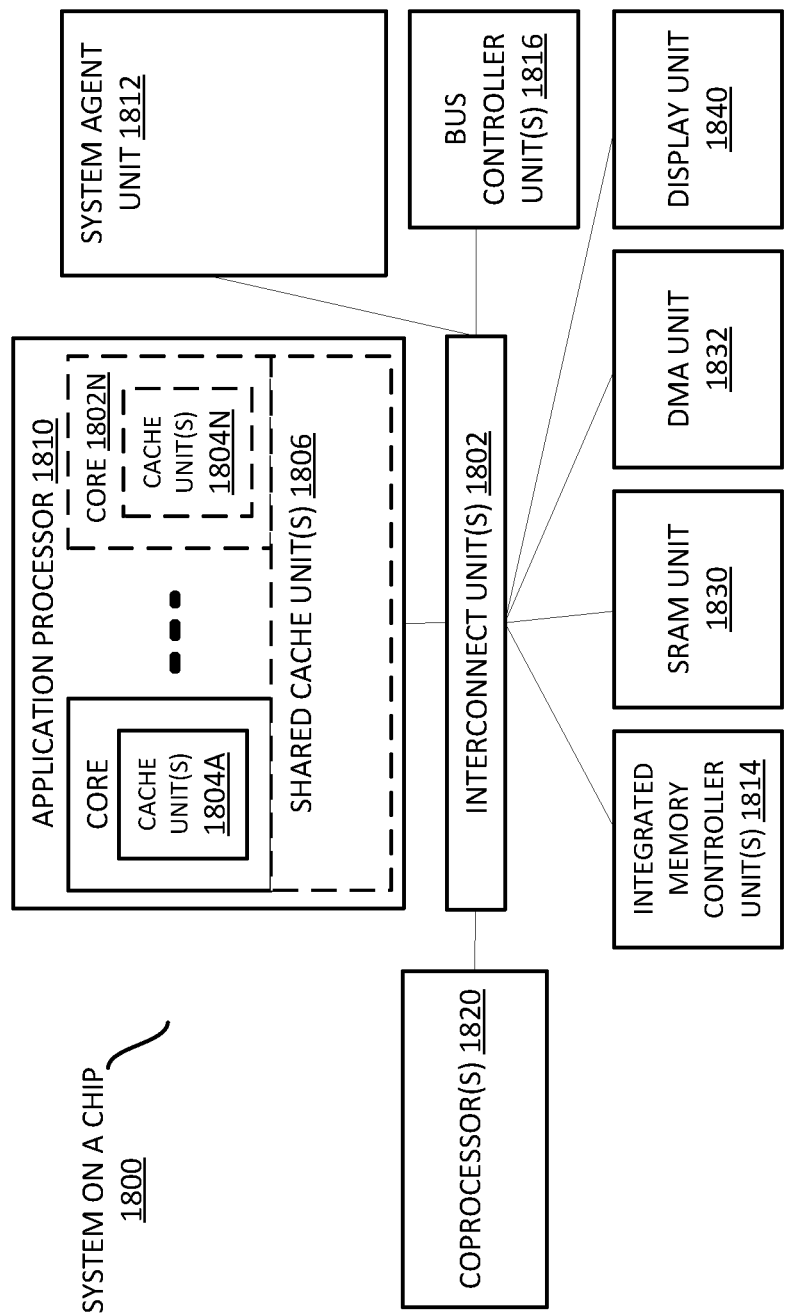

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1820A-N and shared cache unit(s) 1806; a system agent unit 1812; a bus controller unit(s) 1816; an integrated memory controller unit(s) 1814; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
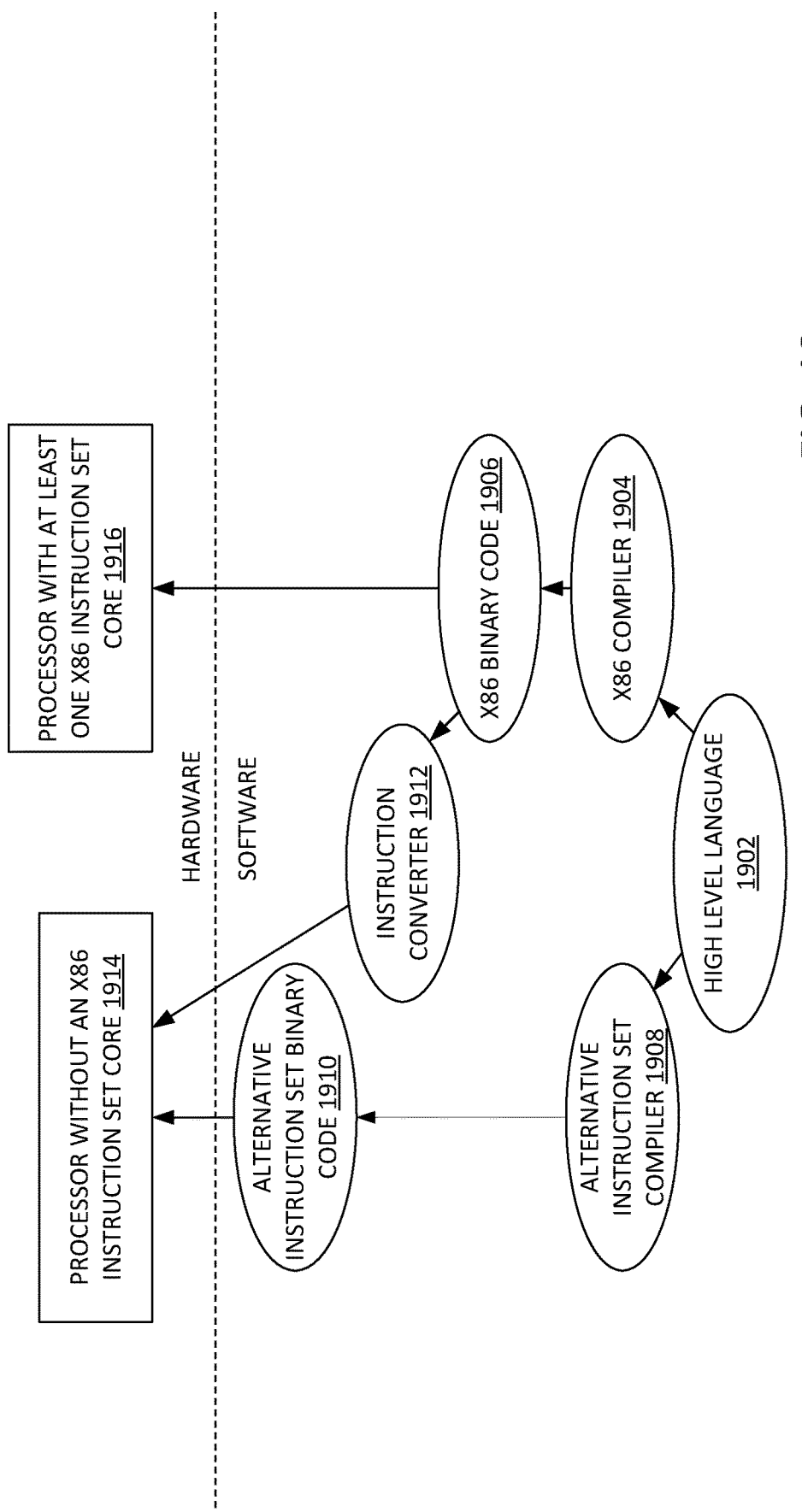
FIG. 19 is a block diagram contrasting the use of a software instruction converter to convert binary instructions in a source instruction set to binary instructions in a target instruction set according to embodiments of the invention.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

Figure 20A:
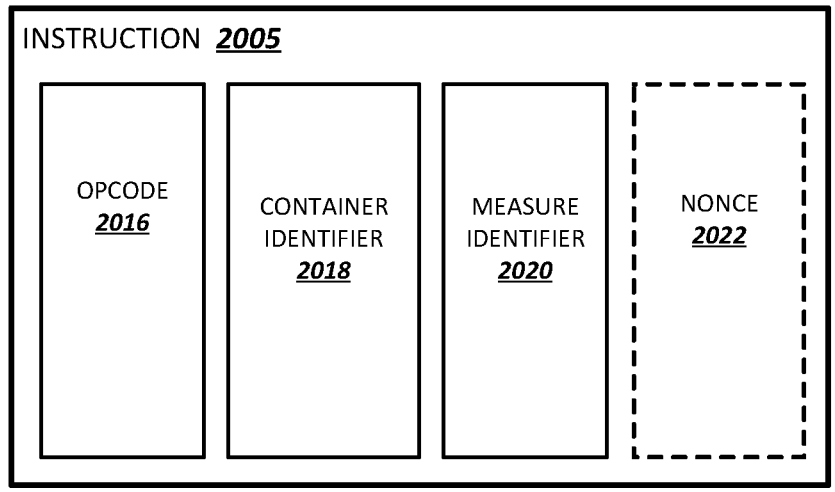
Figure 20B:
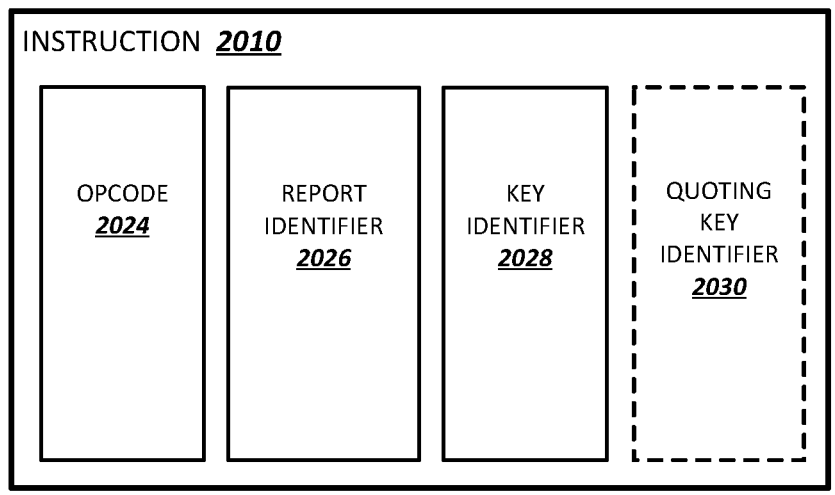

FIGS. 20A-20C are block diagrams 2000a-c illustrating example formats for instructions utilized in connection with the generation of quotes for use in attestations of example secured software container. For instance, in the example of FIG. 20A, an instruction 2005 is provided for generating a report for a secured software container. In this example, the instruction 2005 may include an opcode 2016, a container identifier 2018 (e.g., to identify the container for which a report is being generated), a measure identifier 2020 (e.g., an address of a register or other memory containing measurements of the secured container, or even the measurements themselves), and an optional nonce 2022 (e.g., which may be used to generate a content data integrity code for use in the report, among other examples and implementations.

Turning to the example of FIG. 20B, an instruction 2010 is provided for generating a quote from a report for a secured software container. In this example, the instruction 20105 may include an opcode 2024, a report identifier 2026 (e.g., to identify a register or memory in which the report has been loaded (e.g., in connection with a quote generation request)), a key identifier 2028 (e.g., to identify the type of key that is to be used in connection with the generation of the quote), and an optional quoting key identifier 2030 to identify the quoting key to be used to sign the quote (e.g., in instances where multiple different quoting keys are available), among other examples and implementations.

Turning to the example of FIG. 20C, an instruction 2015 is provided for validating a report (e.g., by a software-based quote creator). In this example, the instruction 2015 may include an opcode 2032, a report identifier 2034 (e.g., to identify a register or memory in which the report has been loaded (e.g., in connection with a report validation request)), and an optional data integrity code identifier 2036 (e.g., to identify the data integrity code used in the report), among other examples and implementations.

Figure 21A:
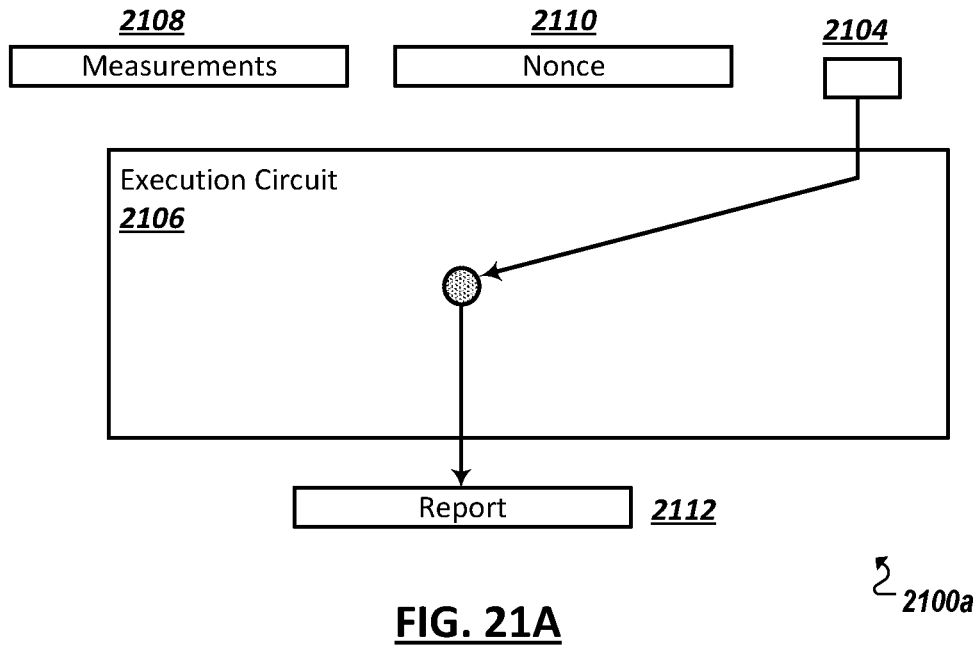
FIG. 21A-C are simplified block diagrams illustrating various embodiments of processes to be performed by a processor to execute an instruction.
Figure 21B:
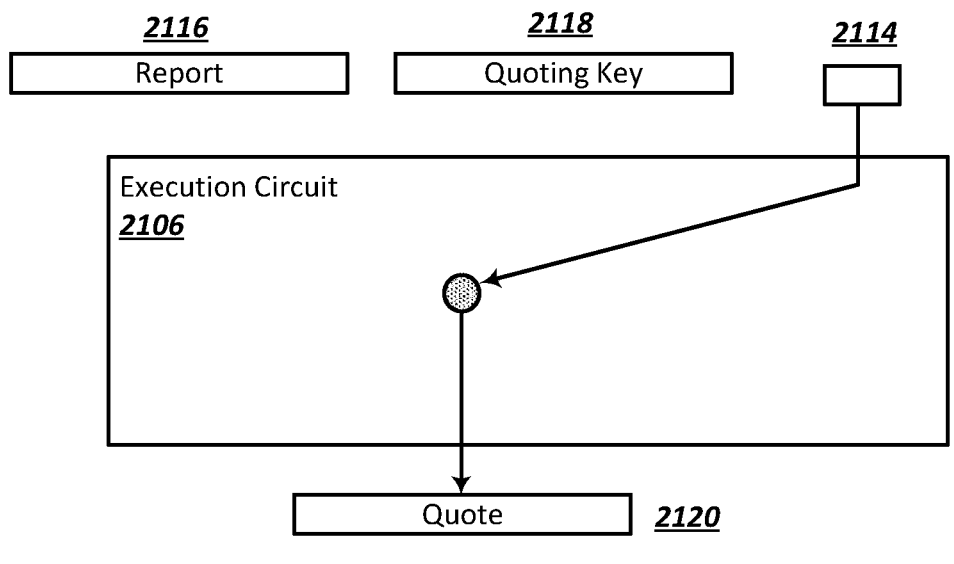
Figure 21C:
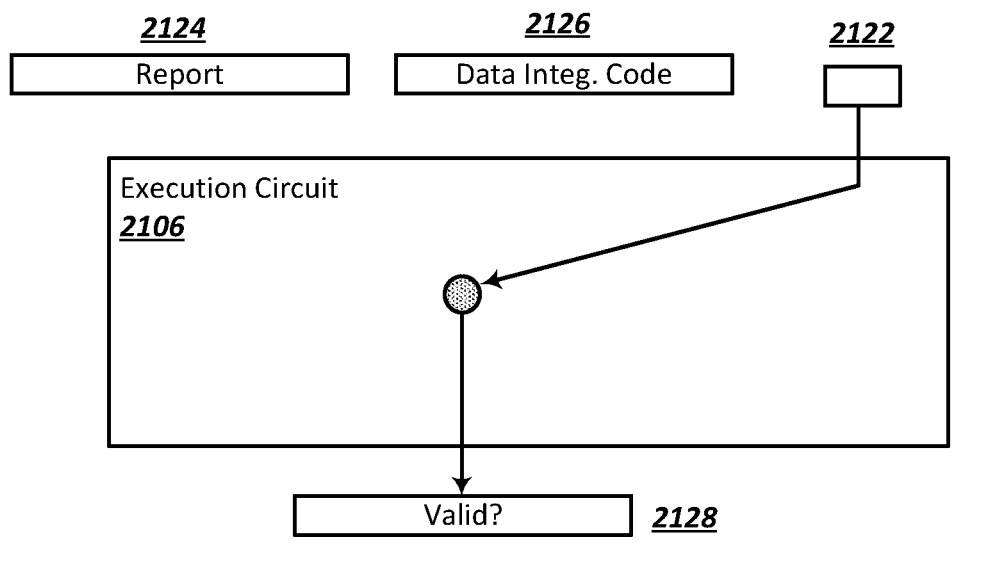

FIGS. 21A-21C are block flow diagrams illustrating various embodiments of processes to be performed by a processor to execute an instruction (e.g., 2005, 2010, 2015, etc.) in connection with the generation of quotes for use in attestations of example secured software container. Embodiments of the logic to implement the functionality illustrated in FIGS. 21A-21C may be implemented in hardware, software, firmware, or a combination of such implementation approaches. Some embodiments are to be implemented as computer programs or program code executing on programmable systems comprising at least one processor, a storage system (including volatile and non-volatile memory and/or storage elements), at least one input device, and at least one output device. It should be understood that the functionality illustrated in FIGS. 21A-21C does not by itself suffice to perform all aspects of an application or other software, but is instead provided to illustrate relevant aspects of embodiments disclosed herein. Additional software routines to control inputs and outputs and other functionality are known to those of ordinary skill and may be used.

FIG. 21A is a block flow diagram 2100a illustrating execution of an instruction for a generating a report corresponding to a secured software container, according to an embodiment. As shown in the block diagram 2100a, the instruction may specify an opcode corresponding to a first instruction, which takes a secured container identifier, container measurements, and a nonce as parameters. An operand 2104 may be called and execution circuitry 2106 of a processor may obtain the measurements 2108 and nonce 2110, and may generate a report 2112 that includes a data integrity code and the measurements. The report may be provided in a register or other memory for access by other components of a system (e.g., a quote creator).

Turning to FIG. 21B, a block flow diagram 2100b is shown illustrating execution of an instruction for generating a quote corresponding to a secured software container, according to an embodiment. As shown in the block diagram 2100b, the instruction may specify an opcode corresponding to the instruction, which takes a report and a quoting key as parameters. An operand 2114 may be called and execution circuitry 2106 of a processor (e.g., the same or different execution circuitry used in the example of FIG. 21A) may obtain a particular report (e.g., provided or pointed-to in a corresponding quote creation request) generate a quote 2120 signed using a quoting key 2118. The quote may be provided in a register or other memory for access by other components of a system (e.g., a quote consumption logic of a program hosted in the secured software container, among other examples).

Turning to FIG. 21C, a block flow diagram 2100c is shown illustrating execution of an instruction for validating a report corresponding to a secured software container, according to an embodiment. As shown in the block diagram 2100c, the instruction may specify an opcode corresponding to the instruction, which takes a report and a data integrity code identifier as parameters. An operand 2122 may be called and execution circuitry 2106 of a processor (e.g., the same or different execution circuitry used in the example of FIGS. 21A-B) may obtain a particular report (e.g., provided or pointed-to in a corresponding report validation request) and obtain a data integrity code 2126 to determine whether the provided report is authentic or not. The execution circuitry 2106 may return a true/false value (e.g., by a setting a bit in a register or return data) to identify to the requester whether the report 2124 is valid or not.

Figure 22:
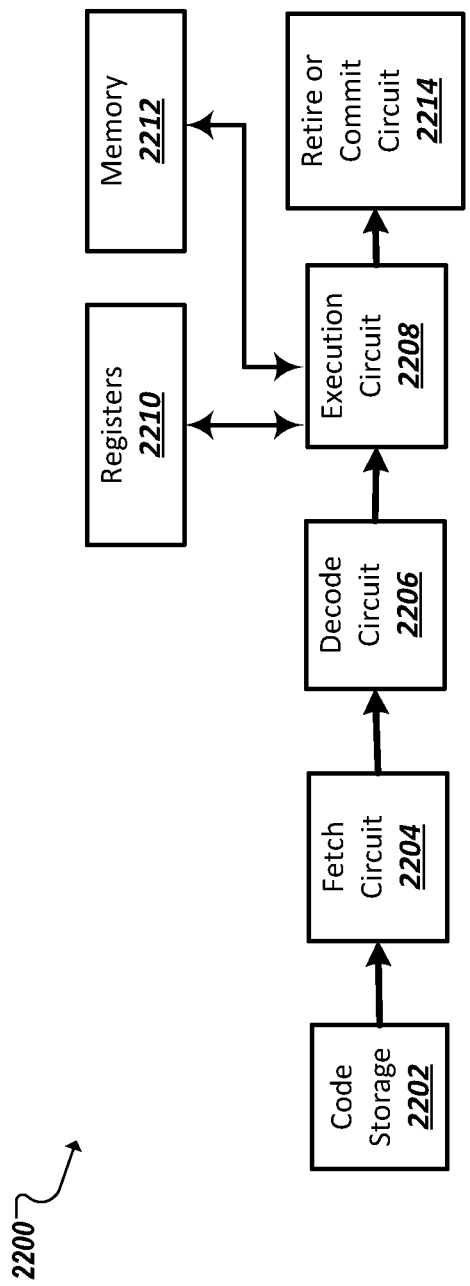
FIG. 22 illustrating processing components for executing instructions.

FIG. 22 is a block diagram illustrating processing components for executing instructions such as those illustrated in examples FIGS. 20A-21C. As shown, computing system 2200 includes code storage 2202, fetch circuit 2204, decode circuit 22106, execution circuit 2208, registers 2210, memory 2212, and retire or commit circuit 2214. In operation, an instruction is to be fetched by fetch circuit 22104 from code storage 2202, which may comprise a cache memory, an on-chip memory, a memory on the same die as the processor, an instruction register, a general register, or system memory, without limitation. In one embodiment, the instruction has a format similar to that of the example instructions of FIGS. 20A-20C. After fetching the instruction from code storage 22102, decode circuit 2206 decodes the fetched instruction, including by parsing the various fields of the instruction. After decoding the fetched instruction, execution circuit 2208 is to execute the decoded instruction. In performing the step of executing the instruction, execution circuit 2208 may read data from and write data to registers 2210 and memory 2212. Registers 2210 may include a data register, an instruction register, a vector register, a mask register, a general register, an on-chip memory, a memory on the same die as the processor, or a memory in the same package as the processor, without limitation. Memory 2212 may include an on-chip memory, a memory on the same die as the processor, a memory in the same package as the processor, a cache memory, or system memory, without limitation. After the execution circuit executes the instruction, retire or commit circuit 2214 may retire the instruction, ensuring that execution results are written to or have been written to their destinations, and freeing up or releasing resources for later use, among other example implementations and features.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 s a device including: a processor; a memory element including secured memory; data integrity logic, executable by the processor, to access a hardware-based secret; and generate a data integrity code using the hardware based secret. The device may further include a container manager, executable by the processor, to create a secured container including report generation logic, where the report generation logic of the secured container is executable by the processor to: determine measurements of the secured container; generate a report according to a defined report format, where the defined report format includes a field to include the measurements and a field to include the data integrity code, and the report format is compatible for consumption by any one of a plurality of different quote creator types; and send a quote request including the report.

Example 2 may include at least some of the subject matter of example 1, where the secured container is to further include quote consumption logic executable by the processor to: receive a quote generated by a particular quote creator in response to the quote request; and use the quote in an attestation of at least one of the secured container and a software component loaded in the secured container.

Example 3 may include at least some of the subject matter of example 2, where the container manager is further to load the software component into the secured container and the measurements further include measurements of the software component.

Example 4 may include at least some of the subject matter of any one of examples 2-3, further including a handler, executable by the processor, to: intercept the quote request; forward the quote request to the particular quote creator; receive the quote from the particular quote creator; and forward the quote to the quote consumption logic.

Example 5 may include at least some of the subject matter of example 4, where the handler is further executable to: determine a set of quote creators available to handle the quote request; and select the particular quote creator from the set of quote creators.

Example 6 may include at least some of the subject matter of example 5, where the particular quote creator is selected according to one or more criteria.

Example 7 may include at least some of the subject matter of example 6, where the criteria is based on a level of security provided by the respective type of quote creator.

Example 8 may include at least some of the subject matter of any one of examples 5-7, where the set of quote creators includes a plurality of different quote creators.

Example 9 may include at least some of the subject matter of any one of examples 4-8, where the secured container includes a secured virtual machine (VM), the container manager includes a virtual machine manager (VMM), and the VMM includes the handler.

Example 10 may include at least some of the subject matter of any one of examples 2-9, where the particular quote creator sends the quote based on a validation of the report by the particular quote creator using the data integrity code.

Example 11 may include at least some of the subject matter of any one of examples 2-10, where the quote includes the measurements of the encrypted virtual machine and is encrypted by a quoting key, and using the quote in the attestation includes sending the quote to a particular software system.

Example 12 may include at least some of the subject matter of example 11, where the particular software system is hosted on a remote computing system and establishes a secured communication channel with the software component based on validation of the quote.

Example 13 may include at least some of the subject matter of any one of examples 1-12, where the report further includes a data value and the quote further includes the data value.

Example 14 may include at least some of the subject matter of example 13, where the data value includes user data corresponding to a software component loaded in the secured container.

Example 15 may include at least some of the subject matter of any one of examples 1-14, where the defined report format further includes a header and a fixed length.

Example 16 may include at least some of the subject matter of example 15, where the data value includes a public key in a cryptographic key pair associated with the software component.

Example 17 may include at least some of the subject matter of any one of examples 1-16, where the data integrity code includes a message authentication code (MAC).

Example 18 is a method including: generating a hardware-based secret; generating a data integrity code using the hardware based secret; creating a secured container including report generation logic, where the secured container is loaded with a software component; determining measurements of the secured container and software component; generating a report according to a defined report format, where the defined report format includes a field to include the measurements and a field to include the data integrity code, and the report format is compatible for consumption by any one of a plurality of different quote creator types; sending a quote request including the report; and receiving a quote generated by a particular quote creator based on the report.

Example 19 may include at least some of the subject matter of example 18, further including: receiving a quote generated by a particular quote creator in response to the quote request; and using the quote in an attestation of at least one of the secured container and a software component loaded in the secured container.

Example 20 may include at least some of the subject matter of example 19, further including loading the software component into the secured container and the measurements further include measurements of the software component.

Example 21 may include at least some of the subject matter of any one of examples 19-20, further including: intercepting the quote request at a handler; forwarding the quote request from the handler to the particular quote creator; receiving the quote, at the handler, from the particular quote creator; and forwarding the quote from the handler to the secured container.

Example 22 may include at least some of the subject matter of example 21, further including: determining a set of quote creators available to handle the quote request; and selecting the particular quote creator from the set of quote creators.

Example 23 may include at least some of the subject matter of example 22, where the particular quote creator is selected according to one or more criteria.

Example 24 may include at least some of the subject matter of example 23, where the criteria are based on a level of security provided by the respective type of quote creator.

Example 25 may include at least some of the subject matter of any one of examples 22-24, where the set of quote creators includes a plurality of different quote creators.

Example 26 may include at least some of the subject matter of any one of examples 21-25, where the secured container includes a secured virtual machine (VM), the container manager includes a virtual machine manager (VMM), and the VMM includes the handler.

Example 27 may include at least some of the subject matter of any one of examples 19-26, where the particular quote creator sends the quote based on a validation of the report by the particular quote creator using the data integrity code.

Example 28 may include at least some of the subject matter of any one of examples 19-27, where the quote includes the measurements of the encrypted virtual machine and is encrypted by a quoting key, and using the quote in the attestation includes sending the quote to a particular software system.

Example 29 may include at least some of the subject matter of example 28, where the particular software system is hosted on a remote computing system and establishes a secured communication channel with the software component based on validation of the quote.

Example 30 may include at least some of the subject matter of any one of examples 18-29, where the report further includes a data value and the quote further includes the data value.

Example 31 may include at least some of the subject matter of example 30, where the data value includes user data corresponding to a software component loaded in the secured container.

Example 32 may include at least some of the subject matter of any one of examples 18-31, where the defined report format further includes a header and a fixed length.

Example 33 may include at least some of the subject matter of example 32, where the data value includes a public key in a cryptographic key pair associated with the software component.

Example 34 may include at least some of the subject matter of any one of examples 18-33, where the data integrity code includes a message authentication code (MAC).

Example 35 is a system including means to perform the method of any one of examples 18-34.

Example 36 may include at least some of the subject matter of example 35, where the means include a machine readable storage medium storing instructions executable by a machine to perform at least a portion of the method of any one of examples 18-34.

Example 37 is a system including: a host processor; a memory; data integrity logic to generate a hardware-based key; a container manager to implement a secured container to host a software component, where the secured software container includes: measurement logic to determine measurements of the secured container and the software component; report generation logic, executable to generate a report according to a defined report format, where the defined report format includes a field to include the measurements and a field to include a data integrity code generated using the hardware-based key, and the report format is compatible for consumption by any one of a plurality of different quote creator types and send a quote request including the report; and quote consumption logic, executable to receive a quote generated by a particular quote creator in response to the quote request; and use the quote in an attestation of at least one of the secured container and the software component.

Example 38 may include at least some of the subject matter of example 37, further including a handler, executable by the host processor to: intercept the quote request; determine a set of quote creators available to handle the quote request; forward the quote request to the particular quote creator, where the particular quote creator is one of the set of quote creators; receive the quote from the particular quote creator; and forward the quote to the quote consumption logic.

Example 39 may include at least some of the subject matter of example 37, where the secured container includes one of a virtual machine or a software container.

Example 40 may include at least some of the subject matter of any one of examples 38-39, where the handler is executable to determine a set of quote creators available to handle the quote request; and select the particular quote creator from the set of quote creators according to one or more criteria.

Example 41 may include at least some of the subject matter of any one of examples 37-40, where the set of quote creators include multiple different quote creators.

Example 42 may include at least some of the subject matter of any one of examples 37-41, further including the particular quote creator, where the particular quote creator has access to the hardware-based key and further includes a quoting key, and the particular quote creator is to: validate data integrity code of the report using the hardware-based key; and generate the quote, where the quote includes the measurements of the virtual machine and is signed using the quoting key.

Example 43 may include at least some of the subject matter of any one of examples 37-42, where the particular quote creator includes instructions on the host processor.

Example 44 may include at least some of the subject matter of any one of examples 37-42, where the particular quote creator includes a trusted cryptographic device separate from and connected to the host processor.

Example 45 may include at least some of the subject matter of any one of examples 37-42, where the particular quote creator includes a secure software enclave.

Example 46 may include at least some of the subject matter of any one of examples 42-45, where the quote key includes an asymmetric signing key having a corresponding certificate.

Example 47 may include at least some of the subject matter of example 46, further including a certification system hosting the certificate to validate a quote signed by the particular quote creator.

Example 48 may include at least some of the subject matter of ay one of examples 37-47, where the handler includes a virtual machine manager (VMM).

Example 49 is an apparatus including a processor including a decoder to decode a first instruction and one or more execution units to execute the decoded first instruction to: obtain one or more parameters from a secured software container; obtain a data integrity code based on a hardware-based secret; generate a report according to a defined report format, where the report includes the data integrity code; and provide the report.

Example 50 may include at least some of the subject matter of example 49, where the processor includes a host processor of a device, the report is to be provided for access by a handler to be executed on the device, and the handler is to identify one or more one or more quote creators on the device, and generate a quote request including the report.

Example 51 may include at least some of the subject matter of any one of examples 49-50, where the report is to be provided for access by the secured container.

Example 52 may include at least some of the subject matter of any one of examples 49-51, where the decoder is to further decode a second instruction, and the one or more execution units are to execute the second instruction to: obtain the report; access a quoting key; generate a signature using the quoting key; and return a quote including the signature.

Example 53 may include at least some of the subject matter of example 52, where the processor includes a host processor of a device, the second instruction is to be decoded in association with a call by a handler to be executed on the device, and the call is based on a quote request intercepted by the handler from a secure container to be hosted on the device.

Example 54 may include at least some of the subject matter of any one of examples 49-53, where the processor includes a host processor of a device, the decoder is to further decode a third instruction, and the one or more execution units are to execute the third instruction to: obtain a report verification request from a software-based quote creator to be executed on the device; identify the report from the report verification request; obtain the report; identify the data integrity code; verify the data integrity code; and return a report verification result to the quote creator.

Example 55 may include at least some of the subject matter of any one of examples 49-54, where the data integrity code includes a message authentication code (MAC).

Example 56 may include at least some of the subject matter of any one of examples 49-55, where the parameters include measurements of the secured container, the defined report format includes a field to include the measurements and a field to include the data integrity code.

Example 57 may include at least some of the subject matter of example 56, where the defined report format enables the report to be consumed by any of a plurality of different quote creator types.

Example 58 may include at least some of the subject matter of any one of examples 56-57, where the defined report format further includes a header and a fixed length.

Example 59 is a machine accessible storage medium having instructions stored thereon, where the instructions, when executed on a machine, cause the machine to: obtain a data integrity code generated from a hardware-based secret on a device; determine one or more measurements of a secured software container to be hosted on the device, where the secured software container is to host one or more software components; generate a report according to a defined report format, where the report includes the measurements and the data integrity code, and the report format enables consumption of the report by any one of a plurality of different quote creator types; send a quote request including the report; receive a quote generated by a particular quote creator in response to the quote request; and send the quote to another system to perform an attestation of at least one of the secured container and the one or more software components.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus comprising:
   a processor; and
   at least one non-transitory machine-readable storage medium storing a virtual machine manager executable by the processor to:
   launch a trust domain, wherein software is to be run in the trust domain;

load a trust domain module associated with the trust domain, wherein the trust domain module is to:
  record contents and configuration of the trust domain during the launch of the trust domain; and
  generate a trust domain report structure of the trust domain, wherein the trust domain report structure comprises:
    measurements of the trust domain;
    measurements from the processor; and
    a data integrity code generated from a key accessible only to the processor;
send, from the virtual machine manager, a request to a quoting enclave to convert the trust domain report structure into a signed quote, wherein the request comprises the trust domain report structure.

2. The apparatus of claim 1, further comprising the quoting enclave, wherein the quoting enclave is executable by the processor to use a certified quote signing key to generate the quote, wherein the quote comprises the trust domain report structure signed using the certified quote signing key.

3. The apparatus of claim 1, wherein the quoting enclave is to be executed on another host device.

4. The apparatus of claim 1, wherein the quoting enclave is to verify integrity of the trust domain report structure prior to generating the quote.

5. The apparatus of claim 1, wherein the key comprises a message authentication code (MAC) key.

6. The apparatus of claim 1, wherein the trust domain comprises a software container in which the software is to be run.

7. The apparatus of claim 5, wherein the trust domain comprises a virtual machine.

8. The apparatus of claim 1, wherein to launch the trust domain comprises to allocate a region of secured memory private to the trust domain.

9. The apparatus of claim 1, wherein the trust domain report structure is to be generated for the trust domain through execution of a report generation instruction of an instruction set associated with the processor.

10. The apparatus of claim 9, wherein the report generation instruction is to be invoked by the trust domain.

11. The apparatus of claim 1, wherein the trust domain report structure is according to a defined report format comprising a plurality of fields.

12. An apparatus comprising:
a processor comprising:
  a decoder to decode a single first instruction of an instruction set of the processor;
  one or more execution units, after the decode of the single first instruction, to perform operations corresponding to the single first instruction, including to:
    obtain first measurements of contents and configuration of a trust domain to be launched on a computing platform, wherein the trust domain comprises a software container in which software is to be run;
    obtain second measurements of the computing platform;
    obtain a data integrity code generated from a key accessible only to a particular processor of the computing platform; and
    generate an integrity-protected trust domain report structure for the trust domain, wherein the trust domain report structure is according to a defined report format and comprises the first measurements, the second measurements, and the data integrity code generated from a hardware-secured key.

13. The apparatus of claim 12, wherein the decoder is further to decode a second instruction and the processor further comprises:
one or more execution units to execute the decoded second instruction to:
  access the trust domain report structure; and
  verify integrity of the trust domain report structure based on the data integrity code.

14. A method comprising:
launching a trust domain on a computing platform, wherein the trust domain comprises a software container in which software is to be run;
recording initial contents and configuration of the trust domain during the launch of the trust domain;
generating a trust domain report structure of the trust domain, wherein the trust domain report structure comprises:
  measurements of the trust domain;
  measurements of the computing platform; and
  a data integrity code generated from a key accessible only to a particular processor on the computing platform;
verifying the trust domain report structure based on the data integrity code in response to performing a single instruction of an instruction set of the particular processor; and
causing a quote to be generated from the trust domain report structure by a quoting enclave based on verification of the trust domain report structure, wherein the quote comprises a signed version of the trust domain report structure signed using a certified quote signing key.

15. At least one non-transitory machine-readable storage medium with instructions stored thereon, the instructions executable to cause a machine to perform operations, including to:
launch a trust domain on a computing platform, wherein the trust domain comprises a software container in which particular software is to be run;
record contents and configuration of the trust domain during the launch of the trust domain;
generate a trust domain report structure of the trust domain, wherein the trust domain report structure comprises:
  measurements of the trust domain;
  measurements of the computing platform; and
  a data integrity code generated from a key accessible only to a particular processor on the computing platform;
verify the trust domain report structure based on the data integrity code in response to performing a single instruction of an instruction set of the particular processor; and
cause a quote to be generated from the trust domain report structure by a quoting enclave based on verification of the trust domain report structure, wherein the quote comprises a signed version of the trust domain report structure signed using a certified quote signing key.

16. A system comprising:
a processor;
a memory;
a virtual machine manager stored in the memory and executable by the processor to:
  launch a trust domain, wherein particular software is to be run in the trust domain;
  load a trust domain module associated with the trust domain, wherein the trust domain module is to:
    record initial contents and configuration of the trust domain during the launch of the trust domain; and
    generate a trust domain report structure of the trust domain, wherein the trust domain report structure comprises:
      measurements of the trust domain;
      measurements from the processor; and
      a data integrity code generated from a key accessible only to the processor; and
  send, from the virtual machine manager, a request to a quoting enclave to convert the trust domain report structure into a signed quote, wherein the request comprises the trust domain report structure;
the quoting enclave stored in the memory and executable to:
  determine whether integrity of the trust domain report structure is verified; and
  sign the trust domain report structure using a certified quote signing key to generate a quote from the trust domain report structure.

17. The system of claim 16, further comprising report verification logic executable by the processor to verify the trust domain report structure based on the data integrity code, wherein the quoting enclave is to generate the quote based on verification of the trust domain report structure by the report verification logic.

18. The system of claim 17, wherein the processor comprises an instruction set including:
a report generation instruction to generate the trust domain report structure; and
a report verification instruction to verify the trust domain report structure based on the data integrity code.

19. The system of claim 16, wherein the trust domain is to initiate a request to generate the quote, and the request comprises the trust domain report structure.

* * * * *